US012480698B2

(12) United States Patent
Yang et al.

(10) Patent No.: US 12,480,698 B2
(45) Date of Patent: Nov. 25, 2025

(54) REFRIGERATOR

(71) Applicant: HISENSE RONSHEN (GUANGDONG) REFRIGERATOR CO., LTD., Guangdong (CN)

(72) Inventors: Chunhua Yang, Guangdong (CN); Huimin Yao, Guangdong (CN); Yuhua Guo, Guangdong (CN); Xiaofen Long, Guangdong (CN); Zhidong Li, Guangdong (CN); Guisheng Chen, Guangdong (CN); Tengchang Li, Guangdong (CN); Jinying Yang, Guangdong (CN); Sheng Chen, Guangdong (CN); Yanwu Fan, Guangdong (CN); Yumin Liu, Guangdong (CN); Dongning Zhi, Guangdong (CN); Jiawei Zhu, Guangdong (CN); Lei Huang, Guangdong (CN)

(73) Assignee: HISENSE RONSHEN (GUANGDONG) REFRIGERATOR CO., LTD., Foshan (CN)

( * ) Notice: Subject to any disclaimer, the term of this patent is extended or adjusted under 35 U.S.C. 154(b) by 250 days.

(21) Appl. No.: 18/485,577

(22) Filed: Oct. 12, 2023

(65) Prior Publication Data

US 2024/0035726 A1    Feb. 1, 2024

Related U.S. Application Data

(63) Continuation-in-part of application No. PCT/CN2022/083457, filed on Mar. 28, 2022.

(30) Foreign Application Priority Data

May 25, 2021    (CN) .......................... 202110575878.8
May 28, 2021    (CN) .......................... 202110598791.2
(Continued)

(51) Int. Cl.
*F25C 1/24*    (2018.01)

(52) U.S. Cl.
CPC ............ *F25C 1/24* (2013.01); *F25C 2400/10* (2013.01); *F25C 2400/14* (2013.01); *F25C 2600/02* (2013.01); *F25C 2600/04* (2013.01)

(58) Field of Classification Search
CPC .... F25C 1/24; F25C 2400/10; F25C 2400/14; F25C 2600/02; F25C 2600/04; F25C 1/25;
(Continued)

(56) References Cited

U.S. PATENT DOCUMENTS

2005/0132733 A1    6/2005   Rafalovich et al.
2009/0293508 A1    12/2009  Rafalovich et al.
(Continued)

FOREIGN PATENT DOCUMENTS

CN    102116563 A    7/2011
CN    102116564 A    7/2011
(Continued)

OTHER PUBLICATIONS

International Search Report and Written Opinion dated Jan. 30, 2022 in corresponding International Application No. PCT/CN2021/132295, translated, 16 pages.
(Continued)

*Primary Examiner* — Kun Kai Ma
(74) *Attorney, Agent, or Firm* — MH2 TECHNOLOGY LAW GROUP LLP

(57) ABSTRACT

A refrigerator includes a refrigerator body, an ice maker, a refrigeration cycle system, and a controller. The refrigerator
(Continued)

body includes a chamber. The ice maker is located in the chamber and is configured to make ice. The ice maker includes two refrigerant pipes. The refrigeration cycle system includes a compressor, a condenser, and two cooling flow paths. The two cooling flow paths are connected to the two refrigerant pipes, respectively, and the two cooling flow paths are configured to cool the ice maker. The controller is configured to control the compressor to be turned on or off and control the two cooling flow paths to open or be closed, so as to cool the ice maker through at least one of the two refrigerant pipes.

20 Claims, 22 Drawing Sheets

(30) Foreign Application Priority Data

| Date | | Number |
|---|---|---|
| May 28, 2021 | (CN) | 202110605786.X |
| May 28, 2021 | (CN) | 202110605811.4 |
| May 28, 2021 | (CN) | 202121188877.X |
| May 28, 2021 | (CN) | 202121190183.X |
| Jun. 7, 2021 | (CN) | 202110634423.9 |
| Jun. 7, 2021 | (CN) | 202121266657.4 |
| Jun. 7, 2021 | (CN) | 202121268768.9 |

(58) Field of Classification Search
CPC .... F25C 1/04; F25B 39/02; F25B 5/02; F25B 41/20
See application file for complete search history.

(56) References Cited

U.S. PATENT DOCUMENTS

| | | | |
|---|---|---|---|
| 2011/0162392 A1 | 7/2011 | Lim et al. | |
| 2011/0162405 A1 | 7/2011 | Jeong et al. | |
| 2011/0162406 A1 | 7/2011 | Shin et al. | |
| 2017/0176083 A1 | 6/2017 | Sul et al. | |
| 2017/0191722 A1 | 7/2017 | Bertolini et al. | |
| 2019/0011160 A1* | 1/2019 | Bertolini | F25C 5/08 |
| 2019/0338995 A1* | 11/2019 | Bertolini | F25C 5/22 |
| 2020/0080759 A1* | 3/2020 | Shi | F25C 5/22 |
| 2020/0166260 A1 | 5/2020 | Li et al. | |

FOREIGN PATENT DOCUMENTS

| | | | | |
|---|---|---|---|---|
| CN | 102116569 A | 7/2011 | | |
| CN | 102213526 A | 10/2011 | | |
| CN | 102213527 A | 10/2011 | | |
| CN | 102226616 A | 10/2011 | | |
| CN | 102297556 A | 12/2011 | | |
| CN | 102353205 A | 2/2012 | | |
| CN | 102853587 A | 1/2013 | | |
| CN | 203980766 U | 12/2014 | | |
| CN | 104296454 A | 1/2015 | | |
| CN | 106196827 A | 12/2016 | | |
| CN | 106662388 A | 5/2017 | | |
| CN | 107084576 A | 8/2017 | | |
| CN | 109539657 A | 3/2019 | | |
| CN | 109579391 A | 4/2019 | | |
| CN | 110440504 A | 11/2019 | | |
| CN | 111750594 A | 10/2020 | | |
| CN | 111829257 A | 10/2020 | | |
| CN | 211823378 U | 10/2020 | | |
| CN | 212362534 U | * | 1/2021 | |
| CN | 112460904 A | 3/2021 | | |
| CN | 212870377 U | 4/2021 | | |
| CN | 113237280 A | 8/2021 | | |
| CN | 113357869 A | 9/2021 | | |
| CN | 215216856 U | 12/2021 | | |
| CN | 215373129 U | 12/2021 | | |
| JP | 2004324903 A | 11/2004 | | |
| JP | 2005188912 A | 7/2005 | | |
| JP | 2005188919 A | 7/2005 | | |
| KR | 1020050025448 A | 3/2005 | | |
| KR | 20100113207 A | * | 10/2010 | ............ F25D 23/04 |
| KR | 20110056025 A | * | 5/2011 | ............ F25D 29/00 |
| KR | 20130001972 A | * | 1/2013 | ............... F25C 1/22 |
| KR | 20130093868 A | * | 8/2013 | ............ B01D 35/18 |
| KR | 20140117793 A | * | 10/2014 | ............... F25C 5/02 |

OTHER PUBLICATIONS

International Search Report and Written Opinion dated Jun. 27, 2022 in corresponding International Application No. PCT/CN2022/083457, translated, 19 pages.
Chinese First Office Action dated Nov. 1, 2023 in corresponding Chinese Application No. 202110575878.8, translated, 15 pages.
Chinese First Office Action dated May 30, 2022 in corresponding Chinese Application No. 202110598791.2, translated, 20 pages.
Chinese Second Office Action dated Oct. 20, 2022 in corresponding Chinese Application No. 202110598791.2, translated, 17 pages.
Chinese Decision of Rejection dated Mar. 15, 2023 in corresponding Chinese Application No. 202110598791.2, translated, 17 pages.
Chinese First Office Action dated Oct. 21, 2023 in corresponding Chinese Application No. 202110605786.X, translated, 18 pages.
Chinese First Office Action dated Oct. 14, 2023 in corresponding Chinese Application No. 202110605811.4, translated, 18 pages.
Chinese First Office Action dated May 6, 2022 in corresponding Chinese Application No. 202110634423.9, translated, 18 pages.
Chinese Decision of Rejection dated Oct. 28, 2022 in corresponding Chinese Application No. 202110634423.9, translated, 11 pages.

* cited by examiner

REFRIGERATOR

CROSS-REFERENCE TO RELATED APPLICATIONS

This application is a continuation-in-part application of International Patent Application No. PCT/CN2022/083457, filed on Mar. 28, 2022, pending, which claims priority to Chinese Patent Application No. 202110605786.X, filed on May 28, 2021, Chinese Patent Application No. 202110605811.4, filed on May 28, 2021, Chinese Patent Application No. 202110598791.2, filed on May 28, 2021, Chinese Patent Application No. 202110634423.9, filed on Jun. 7, 2021, Chinese Patent Application No. 202121266657.4, filed on Jun. 7, 2021, Chinese Patent Application No. 202121268768.9, filed on Jun. 7, 2021, Chinese Patent Application No. 202121190183.X, filed on May 28, 2021, Chinese Patent Application No. 202121188877.X, filed on May 28, 2021, and Chinese Patent Application No. 202110575878.8, filed on May 25, 2021, which are incorporated herein by reference in their entireties.

TECHNICAL FIELD

The present disclosure relates to the field of household appliances technology, and in particular, to a refrigerator.

BACKGROUND

Generally, refrigerators achieve an ice making function through an ice maker. The ice maker is generally disposed in an ice making sub-chamber separated from a refrigerating sub-chamber or a freezing sub-chamber. A basic principle of ice making includes: injecting water into an ice tray in the ice maker, then supplying cold to the ice making sub-chamber to make the water in the ice tray freeze into an ice cube, and finally demolding the ice cube from the ice tray and transporting the ice cube into an ice storage box for access by a user.

SUMMARY

A refrigerator is provided. The refrigerator includes a refrigerator body, an ice maker, a refrigeration cycle system, and a controller. The refrigerator body includes a chamber. The ice maker is located in the chamber and is configured to make ice. The ice maker includes two refrigerant pipes. The refrigeration cycle system includes at least one compressor, at least one condenser, and two cooling flow paths. The two cooling flow paths are connected to the two refrigerant pipes respectively, and the two cooling flow paths are configured to cool the ice maker. The controller is configured to control the compressor to be turned on or off and to control the two cooling flow paths to open or be closed, so as to cool the ice maker through at least one of the two refrigerant pipes. The ice maker includes an ice tray. The two refrigerant pipes include a first refrigerant pipe and a second refrigerant pipe. The first refrigerant pipe and the second refrigerant pipe are located at a bottom portion of the ice tray. A portion of the first refrigerant pipe located within a range of the ice tray is at a same height as a portion of the second refrigerant pipe located within the range of the ice tray. In a height direction of the ice maker, a portion of the first refrigerant pipe located outside the range of the ice tray and a portion of the second refrigerant pipe located outside the range of the ice tray are located at different heights.

DETAILED DESCRIPTION

Figure 1:
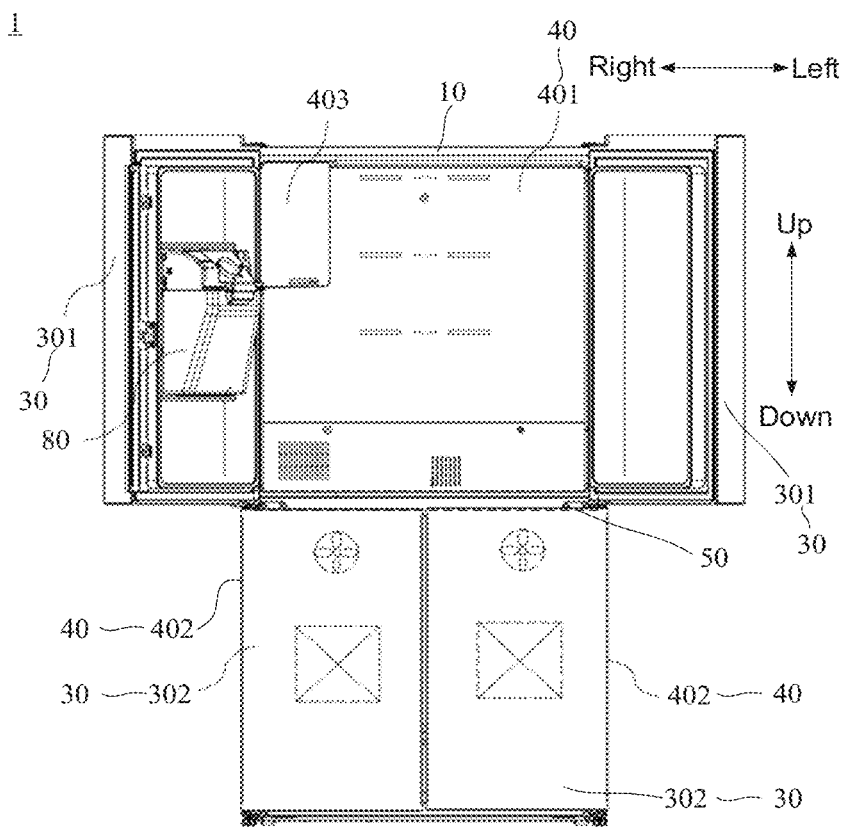
FIG. 1 is a diagram showing a structure of a refrigerator, in accordance with some embodiments.

Some embodiments of the present disclosure will be clearly and completely described below with reference to the accompanying drawings. However, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms such as "first" and "second" are used for descriptive purposes only and are not to be construed as indicating or implying the relative importance or implicitly indicating the number of indicated technical features. Thus, features defined by "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled," "connected," and derivatives thereof may be used. The term "connected" should be understood in a broad sense. For example, the term "connected" may represent a fixed connection, a detachable connection, or a one-piece connection, or may represent a direct connection, or may represent an indirect connection through an intermediate medium. The term "coupled" indicates that two or more components are in direct physical or electrical contact with each other. The term "coupled" or "communicatively coupled" may also mean that two or more components are not in direct contact with each other but still cooperate or interact with each other.

The phrase "at least one of A, B, and C" has the same meaning as the phrase "at least one of A, B, or C", both including the following combinations of A, B, and C: only A, only B, only C, a combination of A and B, a combination of A and C, a combination of B and C, and a combination of A, B, and C.

As used herein, the term "if" is, optionally, construed as "when" or "in a case where" or "in response to determining that" or "in response to detecting," depending on the context. Similarly, depending on the context, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]."

The use of the phrase "applicable to" or "configured to" herein means an open and inclusive expression, which does not exclude devices that are applicable to or configured to perform additional tasks or steps.

The term such as "about," "substantially," and "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

The term such as "parallel," "perpendicular," or "equal" as used herein includes a stated condition and a condition similar to the stated condition. A range of the similar condition is within an acceptable deviation range, and the acceptable deviation range is determined by a person of ordinary skill in the art, considering measurement in question and errors associated with measurement of a particular quantity (i.e., the limitations of a measurement system).

Any value within a range as used herein may be two endpoints, or any value within the range. For example, a preset duration is any value within a range of A min to B min, and the preset duration may be A min, C min, or B min (A<C<B).

A side of a refrigerator 1 facing a user during use is defined as a front side, and a side opposite to the front side is defined as a rear side.

Some embodiments of the present disclosure provide a refrigerator 1. As shown in FIGS. 1 to 4, the refrigerator 1 includes a cabinet body 10, a refrigeration cycle system 20, a door body 30, an ice maker 60, an ice storage box 70, a dispenser 80, and a controller 90 (referring to FIG. 7).

The refrigerator body 10 includes a chamber 40, the refrigeration cycle system 20 is configured to perform heat exchange with outside air of the refrigerator body 10, so as to cool the chamber 40, and the door body 30 is configured to open or close the chamber 40.

The refrigerator body 10 includes a partition plate 50 disposed at a middle position of the refrigerator body 10 in a height direction of the refrigerator body 10. The height direction of the refrigerator body 10 may refer to an up-down direction in FIG. 1, and the partition plate 50 extends substantially in a left-right direction in FIG. 1. A substantial position of the partition plate 50 is shown with reference to the dashed box in FIG. 1. The chamber 40 is partitioned into an upper chamber and a lower chamber by the partition plate 50. In some embodiments, the upper chamber is served as a refrigerating sub-chamber for storing food in a refrigerating mode, and the lower chamber is served as a freezing sub-chamber for storing food in a freezing mode.

The chamber 40 in FIG. 1 includes one second sub-chamber 401 (i.e., a refrigerating sub-chamber) and two first sub-chambers 402 (i.e., two freezing sub-chambers), and the two first sub-chambers 402 are symmetrically arranged. The second sub-chamber 401 is configured to refrigerate food, and the first sub-chamber 402 is configured to freeze food. Of course, in some embodiments, the chamber 40 may also include one second sub-chamber 401 and one first sub-chamber 402.

Figure 2:
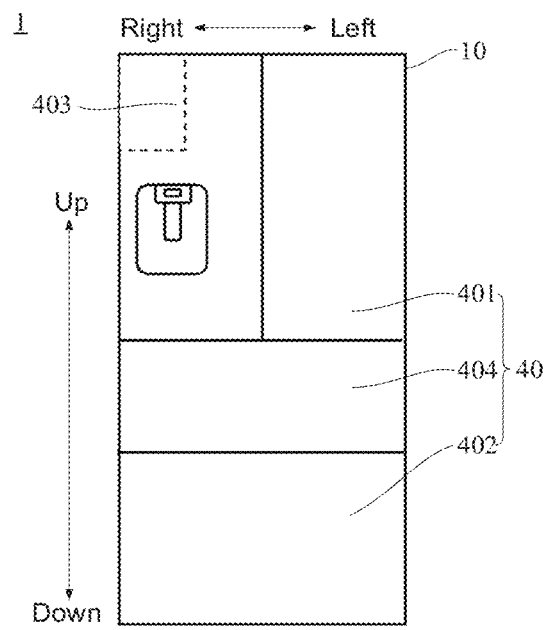
FIG. 2 is a diagram showing a structure of another refrigerator, in accordance with some embodiments.
Figure 5:
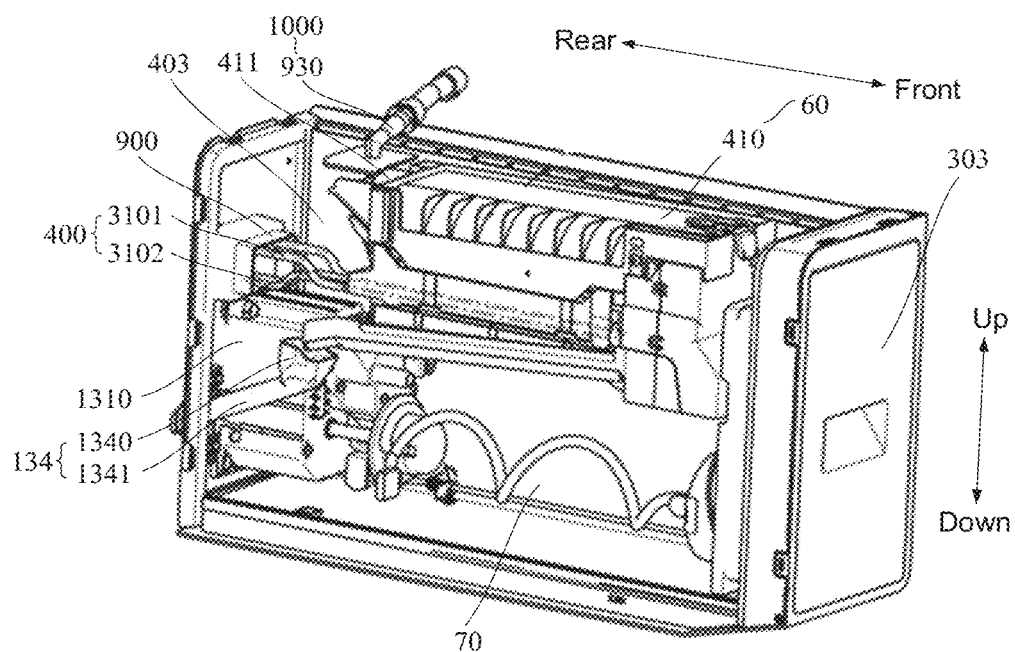
FIG. 5 is a diagram showing a structure of a fourth sub-chamber in a refrigerator from another perspective, in accordance with some embodiments.

In some embodiments, as shown in FIGS. 1 and 2, the chamber 40 further includes a fourth sub-chamber 403 (i.e., an ice making sub-chamber), and the fourth sub-chamber 403 is located on at least one of a left or right side of an inner top portion of the second sub-chamber 401. The fourth sub-chamber 403 is configured to accommodate the ice maker 60 and related ice making components. For example, the fourth sub-chamber 403 may be defined by an insulating shell. As shown in FIG. 5, the fourth sub-chamber 403 is provided with a third door 303, and the third door 303 is located on a side (e.g., a front side) of the fourth sub-chamber 403 proximate to the door body 30. The third door 303 is pivotally installed on the fourth sub-chamber 403, so that the third door 303 may be opened to take out ice cubes in the ice storage box 70.

In some embodiments, as shown in FIG. 5, the fourth sub-chamber 403 is provided with a connecting portion 900 located on a rear wall 1310 of the fourth sub-chamber 403, and a refrigerant pipe in the ice maker 60 may pass through the connecting portion 900, so as to be connected with the refrigeration cycle system 20. Here, the rear wall 1310 is a side wall of the fourth sub-chamber 403 away from the third door 303. For example, the connecting portion 900 is a through hole that runs through the rear wall 1310.

Figure 3:
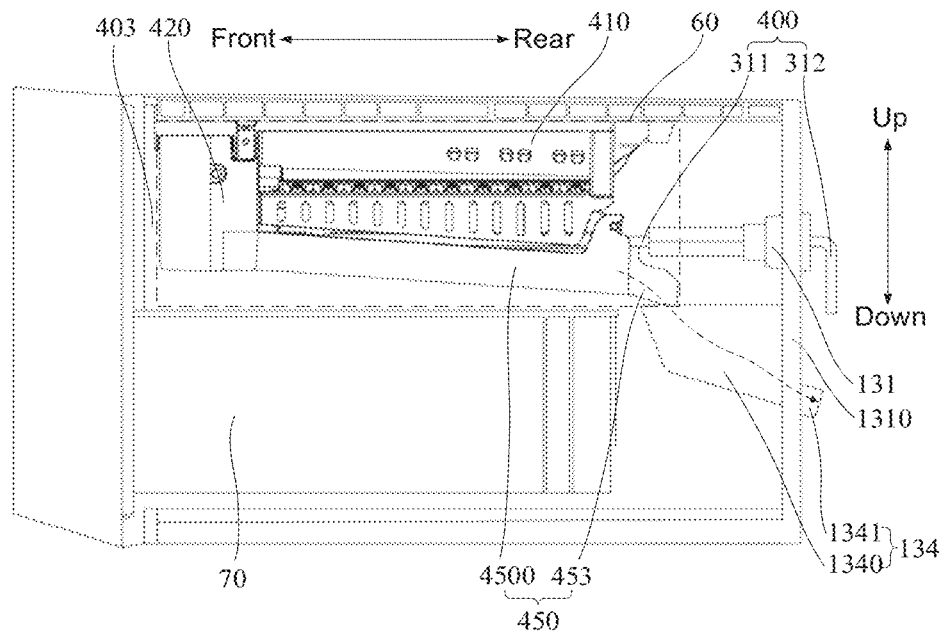
FIG. 3 is a diagram showing a structure of a fourth sub-chamber in a refrigerator, in accordance with some embodiments.

In some embodiments, as shown in FIG. 3, the ice maker 60 is located in the fourth sub-chamber 403. Compared to arranging the ice maker 60 in the first sub-chamber 402, providing the ice maker 60 in the fourth sub-chamber 403 located in the second sub-chamber 401 may prevent water vapor generated by the ice maker 60 during the ice making process from frosting on a shell of the ice maker 60 or a shell of the fourth sub-chamber 403.

In some embodiments, as shown in FIG. 2, the chamber 40 further includes a third sub-chamber 404 (i.e., a variable temperature sub-chamber). The refrigerator body 10 in FIG. 2 includes a second sub-chamber 401, a first sub-chamber 402, and a third sub-chamber 404. The third sub-chamber 404 is located between the second sub-chamber 401 and the first sub-chamber 402, and a temperature in the third sub-chamber 404 may be adjusted, so as to meet various demands (e.g., refrigeration or freshness preservation).

Of course, in some embodiments, the refrigerator body 10 in FIG. 1 may also include a second sub-chamber 401, a first sub-chamber 402, and a third sub-chamber 404. The second sub-chamber 401 is located at an upper portion of the refrigerator body 10. The first sub-chamber 402 and the third sub-chamber 404 each are located at a lower portion of the refrigerator body 10 and are symmetrically arranged in the left-right direction.

The door body 30 includes a first door 301 and a second door 302. The first door 301 may be pivotable, so as to open or close the second sub-chamber 401, and the second door 302 may be pivotable, so as to open or close the first sub-chamber 402.

In some embodiments, as shown in FIG. 1, the refrigerator 1 includes two first doors 301 and two second doors 302. The two first doors 301 (or the two second doors 302) are rotated towards or away from each other, so as to close or open the second sub-chamber 401 (or the first sub-chamber 402).

In some embodiments, as shown in FIGS. 1 and 3, the ice maker 60, the ice storage box 70, and the dispenser 80 together constitute an ice making system. The ice maker 60 is disposed on the top portion of the fourth sub-chamber 403, and configured to make ice according to demands. The ice storage box is located below the ice maker 60 and is configured to store the ice cubes made by the ice maker 60. The dispenser 80 is disposed on the first door 301 and communicates with the ice storage box 70 through a connecting pipeline, so that ice may be taken from the dispenser 80 without opening the first door 301.

Figure 4:
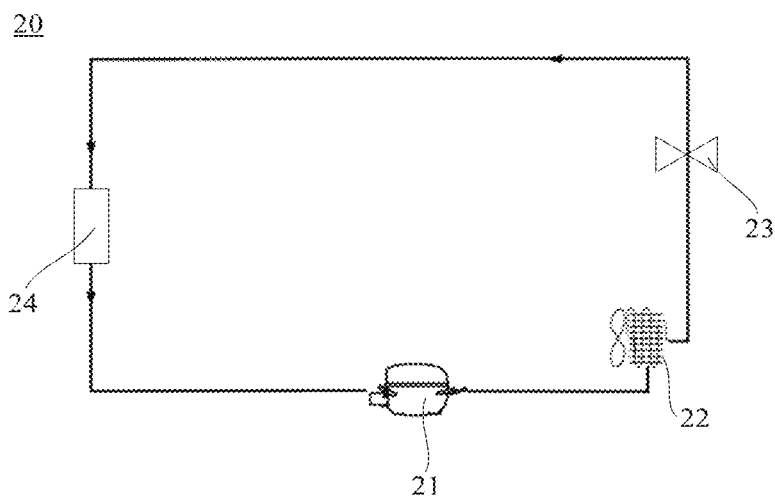
FIG. 4 is a schematic diagram of a refrigeration cycle system in a refrigerator, in accordance with some embodiments.

As shown in FIG. 4, the refrigeration cycle system 20 includes a compressor 21, a condenser 22, a switching valve group 23, and an evaporator 24. A refrigerant circulates in an order of the compressor 21, the condenser 22, the switching valve group 23, the evaporator 24, and the compressor 21, so as to cool the chamber 40. In a case where the compressor 21 operates, the refrigerant is compressed and discharged by the compressor 21, and then passes through the condenser 22 for cooling. The switching valve group 23 may enable the refrigerant to flow to the evaporator 24 or to the ice maker 60. The refrigerant flowing to the evaporator 24 may perform heat exchange through expansion, so as to cool the chamber 40. The refrigerant flowing to the ice maker 60 may perform heat exchange through expansion, so as to cool water in an ice tray in the ice maker 60 to make ice cubes.

Figure 6:
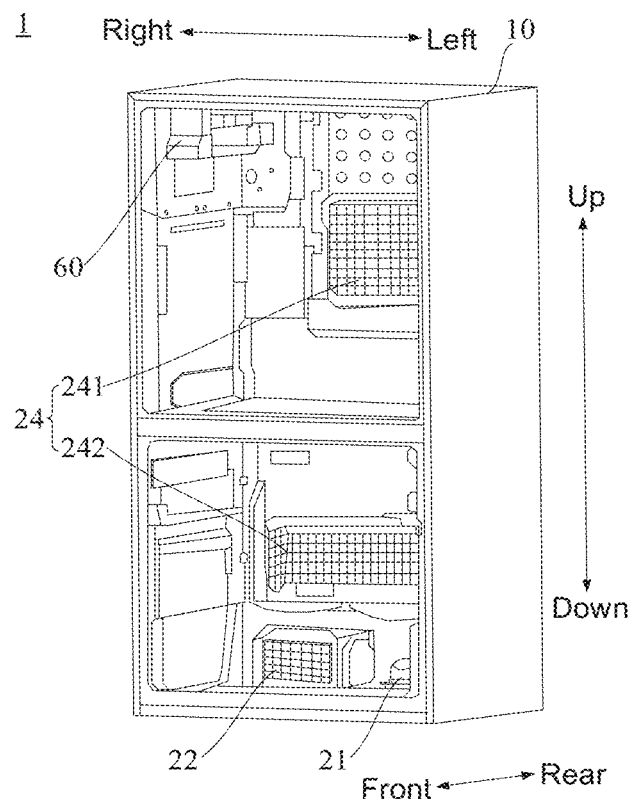
FIG. 6 is a diagram showing an internal structure of a refrigerator without a door body, in accordance with some embodiments.

In some embodiments, as shown in FIG. 6, the evaporator 24 includes a second evaporator 241 and a first evaporator 242. The first evaporator 242 is disposed in the first sub-chamber 402, so as to directly cool the first sub-chamber 402. The second evaporator 241 is disposed in the second sub-chamber 401, so as to directly cool the second sub-chamber 401.

Figure 12:
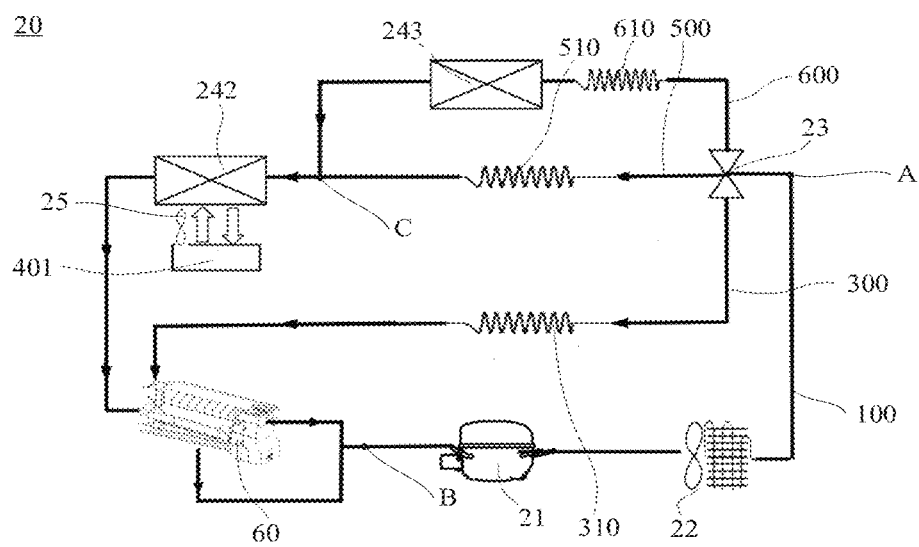
FIG. 12 is a schematic diagram of yet another refrigeration cycle system in a refrigerator, in accordance with some embodiments.

In some embodiments, as shown in FIG. 12, the evaporator 24 includes the first evaporator 242 and a third evaporator 243. The third evaporator 243 is disposed in the third sub-chamber 404, so as to directly cool the third sub-chamber 404. The location and function of the first evaporator 242 are the same as those described above, and details will not be repeated herein.

It will be noted that cooling principles of the second evaporator 241, the first evaporator 242, and the third evaporator 243 are similar to each other. Among the plurality of evaporators 24, since different sub-chambers need different temperatures, the cold generated by the evaporators 24 corresponding to different sub-chambers is also different. For example, the temperature in the first sub-chamber 402 is usually less than the temperature in second sub-chamber 401. Therefore, the volume of the first evaporator 242 may be greater than that of the second evaporator 241, so that the first evaporator 242 may generate a large amount of cold.

Figure 7:
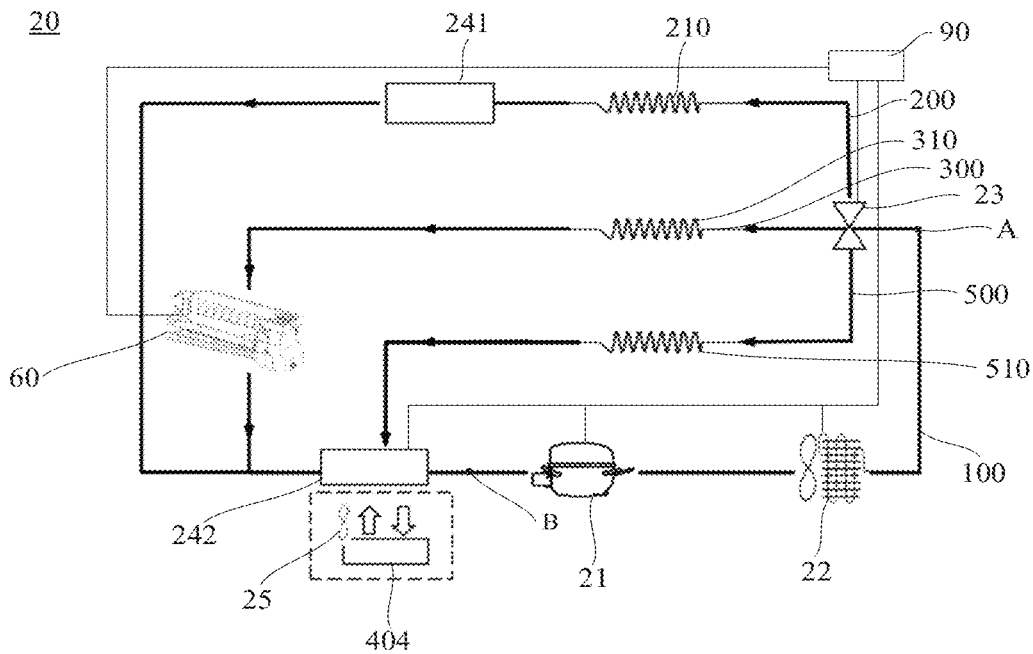
FIG. 7 is a schematic diagram of another refrigeration cycle system in a refrigerator, in accordance with some embodiments.

In some embodiments, as shown in FIG. 7, the refrigerator 1 further includes a first fan 25 located in at least one of the second sub-chamber 401, the third sub-chamber 404, or the first sub-chamber 402. The controller 90 is coupled to the first fan 25, so as to control start or stop of the first fan 25.

It will be noted that, in a case where a sub-chamber (e.g., the second sub-chamber 401 or the third sub-chamber 404) is not provided with a corresponding evaporator, a sub-chamber provided with a corresponding evaporator may be provided with the first fan 25, and there is an air duct between the sub-chamber provided with the corresponding evaporator and the sub-chamber without the corresponding evaporator. The air duct is provided with an air door, and the air door is opened or closed by the controller 90, so as to open or close the air duct.

In this way, the first fan 25 may transport the cold generated by the evaporator (e.g., the first evaporator 242) to the sub-chamber without the evaporator through the air duct, so as to cool the sub-chamber. In a case where a temperature in the sub-chamber without the evaporator reaches a preset temperature, the controller 90 controls the air door to close the air duct. In addition, the controller 90 controls the start or stop of the first fan 25, so that the cold cycle may be performed among the sub-chambers, so as to balance the temperature in the sub-chambers.

For example, as shown in FIG. 7, the first evaporator 242 is configured to cool the third sub-chamber 404, so as to maintain the temperature in the third sub-chamber 404 not exceeding a first preset temperature. In this case, the first sub-chamber 402 is provided with the first fan 25, and an air duct is provided between the first sub-chamber 402 and the third sub-chamber 404. The first fan 25 transports the cold generated by the first evaporator 242 in the first sub-chamber 402 to the third sub-chamber 404 through the air duct, so as to maintain the temperature in the third sub-chamber 404.

It will be noted that the first preset temperature may be lower than a preset start-up cooling temperature of the third sub-chamber 404. For example, the preset start-up cooling temperature of the third sub-chamber 404 is 5° C., and the first preset temperature may be 4° C. Since the temperature in the chamber 40 changes after a period of time during the cooling of chamber 40, in order to avoid the temperature in the chamber 40 being too high during the cooling process, a response temperature (e.g., the first preset temperature) corresponding to the chamber 40 may be slightly lower than the start-up cooling preset temperature.

In some embodiments, the controller 90 may be a control panel disposed on the refrigerator body 10, or a terminal device, such as a mobile phone or a remote controller.

The controller 90 includes a processor. The processor may include a central processing unit (CPU), a microprocessor, or an application specific integrated circuit (ASIC), and may be configured to perform the corresponding operations described with reference to the controller 90 when the processor executes a program stored in a non-transitory computer readable media coupled to the controller 90.

In some embodiments, the refrigerator 1 further includes a water injecting device 1000. The controller 90 is coupled with the water injecting device 1000, so as to control the water injecting device 1000 to inject water into the ice maker 60.

For example, as shown in FIG. 5, the water injecting device 1000 includes a water inlet pipe 930 and a water valve, and the controller 90 controls the water valve to open or close, so as to control the water inlet pipe 930 to inject water into the ice maker 60. The water inlet pipe 930 is disposed on a top portion of the fourth sub-chamber 403. A water outlet of the water inlet pipe 930 corresponds to a water injecting inlet 411 of the ice maker 60, so as to inject water into the ice maker 60. Since the ice maker 60 is installed on the top portion of the fourth sub-chamber 403, and the water inlet pipe 930 is also installed on the top portion of the fourth sub-chamber 403, a length of the water inlet pipe 930 is shortened, and the space occupied by the water inlet pipe 930 is reduced.

Generally, in a refrigerator with an ice making function, the ice maker is located on a downstream side of the second evaporator. During the ice making process of the ice maker, if refrigerating cooling is performed, since the temperature in the refrigerating sub-chamber is above 0° C., while the ice maker is required to make ice below 0° C., a temperature of the refrigerant used in the second evaporator is higher than a temperature of the refrigerant used in the ice maker for making ice. In this way, when the refrigerant passing through the second evaporator flows through the ice maker located on the downstream of the second evaporator, the temperature of the refrigerant cannot meet the normal ice making temperature of the ice maker, thereby affecting the ice making performance of the ice maker. In this case, the ice maker is required to make ice again after the refrigerating cooling has been completed, which results in a longer ice making time of the ice maker and reduces the ice making efficiency of the ice maker.

The refrigeration cycle system 20 in some embodiments of the present disclosure may improve the ice making efficiency of the ice maker 60 by arranging the ice maker 60 on different flow paths and controlling the flow path corresponding the ice maker 60 to open or close.

The refrigeration cycle system 20 according to some embodiments of the present disclosure will be described in detail below.

In some embodiments, as shown in FIG. 7, the refrigeration cycle system 20 includes a transport flow path 100, a refrigerating flow path 200, and an ice making flow path 300. The transport flow path 100, the refrigerating flow path 200, and the ice making flow path 300 each are disposed in the refrigerator body 10. The compressor 21 and the condenser 22 constitute the transport flow path 100, and the transport flow path 100 includes a refrigerant discharge end A and a refrigerant return end B. The compressor 21 and the condenser 22 are sequentially arranged in a flow direction of a refrigerant in the transport flow path 100. Here, the transport flow path 100 is a first section of a flow path between the refrigerant discharge end A and the refrigerant return end B in FIG. 7, and the compressor 21 and the condenser 22 are provided on the first section of the flow path.

The refrigerating flow path 200 is configured to cool the second sub-chamber 401. An end of the refrigerating flow path 200 is connected to the refrigerant discharge end A, and another end of the refrigerating flow path 200 is connected to the refrigerant return end B. The refrigerating flow path 200 includes a third throttling device 210 and a second evaporator 241 that are sequentially arranged in a flow direction of a refrigerant in the refrigerating flow path 200. Here, the refrigerating flow path 200 is a second section of the flow path between the refrigerant discharge end A and the refrigerant return end B in FIG. 7, and a switching valve group 23, a third throttling device 210, and a second evaporator 241 are provided on the second section of the flow path.

For example, the second evaporator 241 has a refrigerant inlet end and a refrigerant outlet end. The switching valve group 23 is provided on an upstream side of the third throttling device 210. An end of the third throttling device 210 is connected to the refrigerant discharge end A, and another end of the third throttling device 210 is connected to the refrigerant inlet end of the second evaporator 241. The refrigerant outlet end of the second evaporator 241 is connected to the refrigerant return end B.

The ice making flow path 300 is configured to cool the ice maker 60. An end of the ice making flow path 300 is connected to the refrigerant discharge end A, and another end of the ice making flow path 300 is connected to the refrigerant return end B. The ice making flow path 300 includes a first throttling device 310, and the ice maker 60 is disposed on the ice making flow path 300. The first throttling device 310 and the ice maker 60 are sequentially arranged in a flow direction of a refrigerant in the ice making flow path 300. Here, the ice making flow path 300 is a third section of the flow path between the refrigerant discharge end A and the refrigerant return end B in FIG. 7, and the switching valve group 23, the first throttling device 310, and the ice maker 60 are provided on the third section of the flow path.

For example, the ice maker 60 has a refrigerant inlet end and a refrigerant outlet end. The switching valve group 23 is provided on an upstream side of the first throttling device 310. An end of the first throttling device 310 is connected to the refrigerant discharge end A, and another end of the first throttling device 310 is connected to the refrigerant inlet end of the ice maker 60. The refrigerant outlet end of the ice maker 60 is connected to the refrigerant return end B.

The switching valve group 23 is connected to the refrigerant discharge end A and is disposed on upstream sides of the refrigerating flow path 200 and the ice making flow path 300. The controller 90 is coupled with the switching valve group 23, so as to control the switching of the flow paths. In some embodiments, the switching valve group 23 is an electric valve.

In some embodiments, the switching valve group 23 may switch between a first position P1 and a second position P2. In a case where the switching valve group 23 is at the first position P1, the refrigerating flow path 200 communicates with the transport flow path 100, and the ice making flow path 300 is disconnected from the transport flow path 100. In a case where the switching valve group 23 is at the second position P2, the ice making flow path 300 communicates with the transport flow path 100, and the refrigerating flow path 200 is disconnected from the transport flow path 100.

In a case where the ice maker 60 makes ice, the controller 90 controls the ice maker 60 to start and controls the switching valve group 23 to be at the second position P2. In a case where the controller 90 controls a heating device (e.g., a heating tube) and an ice turning mechanism (e.g., an ice turning rod) in the ice maker 60 to perform an ice scraping action, the controller 90 controls the switching valve group 23 to be at the first position P1. In a case where the ice maker 60 has no cooling demand, the controller 90 controls the switching valve group 23 to be at the first position P1.

It will be noted that, a case that the ice maker 60 has no cooling demand includes a case that the ice maker 60 performs the ice scraping action and a case that the ice maker 60 has no ice making demand. After the ice cubes have been made, the ice maker 60 needs to perform the ice scraping action. The ice scraping process of the ice maker 60 includes heating, turning over ice, and draining water. For example, after the ice cubes have been made, the controller 90 controls the heating device in the ice maker 60 to heat the ice tray of the ice maker 60, so that the ice cubes in the ice tray melt slightly and are separated from the ice tray. Then, the controller 90 controls the ice turning mechanism in the ice maker 60 to turn the ice cubes out of the ice tray. After the ice has been turned out, the ice maker 60 drains water.

In a case where the temperature in the second sub-chamber 401 decreases to a second preset temperature and the ice maker 60 has a cooling demand, the controller 90 controls the switching valve group 23 to be at the second position P2.

In a case where the temperature in the second sub-chamber 401 is greater than the second preset temperature and the ice maker 60 has a cooling demand, the second sub-chamber 401 is given priority to cooling, and the controller 90 controls the switching valve group 23 to be at the first position P1. After the temperature in the second sub-chamber 401 decreases to the second preset temperature, the controller 90 controls the switching valve group 23 to be at the second position P2.

It will be noted that the second preset temperature may be less than a shutdown cooling preset temperature of the second sub-chamber 401. For example, the shutdown cooling preset temperature of the second sub-chamber 401 is minus one degree Celsius (i.e., −1° C.), and the second preset temperature may be minus two degrees Celsius (i.e., −2° C.).

The refrigerator 1 provided by some embodiments of the present disclosure, uses the ice scraping time of the ice maker 60 to cool the second sub-chamber 401. Therefore, during the ice scraping process, there is no need for the compressor 21 to stop, which solves a problem that the compressor 21 needs to be restarted after the ice scraping process ends, avoids the frequent startup and shutdown of the compressor 21, and is conducive to prolonging the service life of the compressor 21.

Moreover, during the ice making process, the transport flow path 100 is disconnected from the refrigerating flow path 200, so that the ice making process of the ice maker 60 may not be disturbed. As a result, the amount of refrigerant flowing through the ice maker 60 increases, so that the ice maker 60 may keep a low temperature for making ice, which is conducive to improving the operating efficiency of the ice maker 60.

In addition, the transport flow path 100 is disconnected from the refrigerating flow path 200 during the ice making process, while the transport flow path 100 communicates with the refrigerating flow path 200 during the ice scraping process. Therefore, the temperature in the second sub-chamber 401 may be reduced to the second preset temperature by using the ice scraping time. In this way, during the ice making process, there is no need for a large amount of refrigerant to be supplied to the refrigerating flow path 200 for cooling, so that the refrigerant is mainly supplied to the ice maker 60 to make ice.

Figure 8:
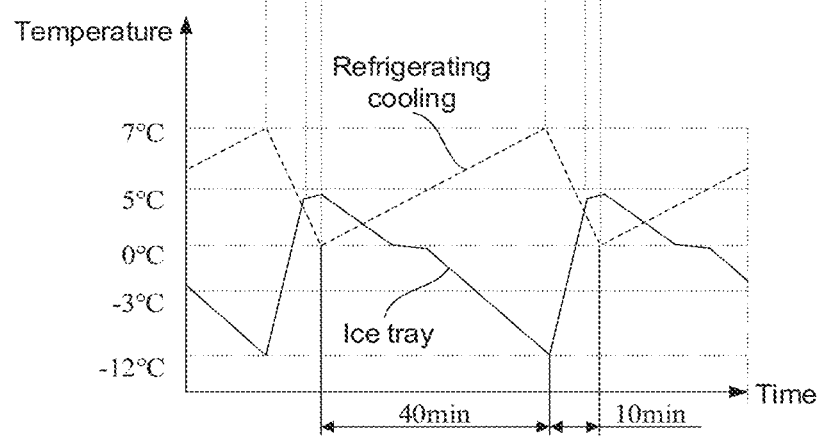
FIG. 8 is a diagram showing an ice making cycle of a refrigerator, in accordance with some embodiments.

In FIG. 8, the ON and OFF corresponding to the ice making represent the start and stop of ice making, respectively. The ON and OFF corresponding to refrigerating cooling mean to perform refrigerating cooling and stop refrigerating cooling, respectively. The ice making is performed after refrigerating cooling stops. The ON and OFF corresponding to the ice scraping and heating mean to perform the ice scraping and heating and stop the ice scraping and heating, respectively. The ice scraping is performed after the ice making is completed (i.e., the ice making stops). Through experimental verification, as shown in FIG. 8, after the refrigerating cooling stops, the ice making starts, and when the ice making is completed, the ice making process has passed for 40 minutes. In this way, the ice making cycle of the refrigerator 1 in some embodiments of the present disclosure may be reduced to 40 minutes. Compared with the 60 minutes ice making cycle of the typical refrigerator, the ice making cycle of the refrigerator 1 in some embodiments of the present disclosure is shorter, which is conducive to improving the ice making efficiency of the ice maker 60.

In some embodiments, as shown in FIG. 7, the refrigeration cycle system 20 further includes a freezing flow path 500 configured to cool the first sub-chamber 402. An end of the freezing flow path 500 is connected to the refrigerant discharge end A, and another end of the freezing flow path 500 is connected to the refrigerant return end B. The freezing flow path 500 includes a second throttling device 510 and a first evaporator 242 that are sequentially arranged in a flow direction of a refrigerant in the freezing flow path 500. Here, the freezing flow path 500 is a fourth section of the flow path between the refrigerant discharge end A and the refrigerant return end B in FIG. 7, and the switching valve group 23, the second throttling device 510, and the first evaporator 242 are provided on the fourth section of the flow path.

For example, the first evaporator 242 has a refrigerant inlet end and a refrigerant outlet end. An end of the second throttling device 510 is connected to the refrigerant discharge end A, and another end of the second throttling device 510 is connected to the refrigerant inlet end of the first evaporator 242. The refrigerant outlet end of the first evaporator 242 is connected to the refrigerant return end B. By providing the second throttling device 510 and the first evaporator 242, it is conducive to achieving the cooling of the first sub-chamber 402.

The switching valve group 23 is disposed on an upstream side of the freezing flow path 500. For example, the switching valve group 23 is disposed on an upstream side of the second throttling device 510. The controller 90 may control the switching valve group 23, so as to make the freezing flow path 500 communicate with or be disconnected from the transport flow path 100, so as to control the distribution of refrigerant.

In some embodiments, as shown in FIG. 7, the first evaporator 242 is located between the second evaporator 241 and the refrigerant return end B. For example, the refrigerant outlet end of the second evaporator 241 is connected to the refrigerant inlet end of the first evaporator 242. In this way, the refrigerant passing through the second evaporator 241 may also flow into the first evaporator 242 for heat exchange after exchanging heat with the second sub-chamber 401 and improve the utilization efficiency of the refrigerant.

In some embodiments, as shown in FIG. 7, the first evaporator 242 is located between the refrigerant outlet end of the ice maker 60 and the refrigerant return end B. For example, the refrigerant outlet end of the ice maker 60 is connected to the refrigerant inlet end of the first evaporator 242. In this way, the refrigerant passing through the ice maker 60 may also flow into the first evaporator 242 for heat exchange after exchanging heat with the ice maker 60, thereby improving the utilization efficiency of the refrigerant.

In some embodiments, the throttling device is a pressure reducer, such as a capillary. The capillary has a function of throttling, reducing pressure, and adjusting flow rate and also has a function of preventing wet compression, liquid shock, and overheating.

It will be noted that the wet compression means that the gaseous refrigerant sucked by the compressor 21 is mixed with liquid refrigerant, which affects the normal operation of the compressor 21. The liquid shock refers to a case that a cylinder in the compressor 21 shocks abnormally after the compressor 21 sucks the gaseous refrigerant mixed with the liquid refrigerant.

Typically, the capillary is a thin and long copper pipe. An inner diameter of the capillary is generally any value within a range of 0.5 mm to 1 mm, and a length of the capillary is any value within a range of 2 m to 4 m. The copper pipe has good thermal conductivity. Since the inner diameter of the capillary is small, and only a constant amount of high-pressure liquid may pass through the capillary, the pressure of the refrigerant decreases after the refrigerant enters the evaporator 24 from the capillary, so that the refrigerant absorbs heat and changes from a liquid state to a gaseous state, so as to achieve cooling.

Moreover, after the compressor 21 transports the refrigerant to the condenser 22, the capillary blocks the refrigerant, so that the refrigerant may maintain a high-pressure state in the condenser 22, and the refrigerant may be cooled from a gaseous state to a liquid state. In addition, the flow rate of the refrigerant may also be adjusted by the capillary, so as to adjust an evaporation temperature of the evaporator 24.

The controller 90 selects the flow path according to the priority of cooling and can meet the requirements of on-demand cooling of a corresponding sub-chamber by controlling the start and stop of the ice maker 60, the evaporator 24, and the first fan 25 of the corresponding sub-chamber.

The above is mainly described that a flow path where the ice maker 60 is located is different from the refrigerating flow path 200 with reference to FIG. 7, (that is, the refrigerant outlet end of the second evaporator 241 in the refrigerating flow path 200 is disconnected from the refrigerant inlet end of the ice maker 60), however, the present disclosure is not limited thereto.

Figure 9:
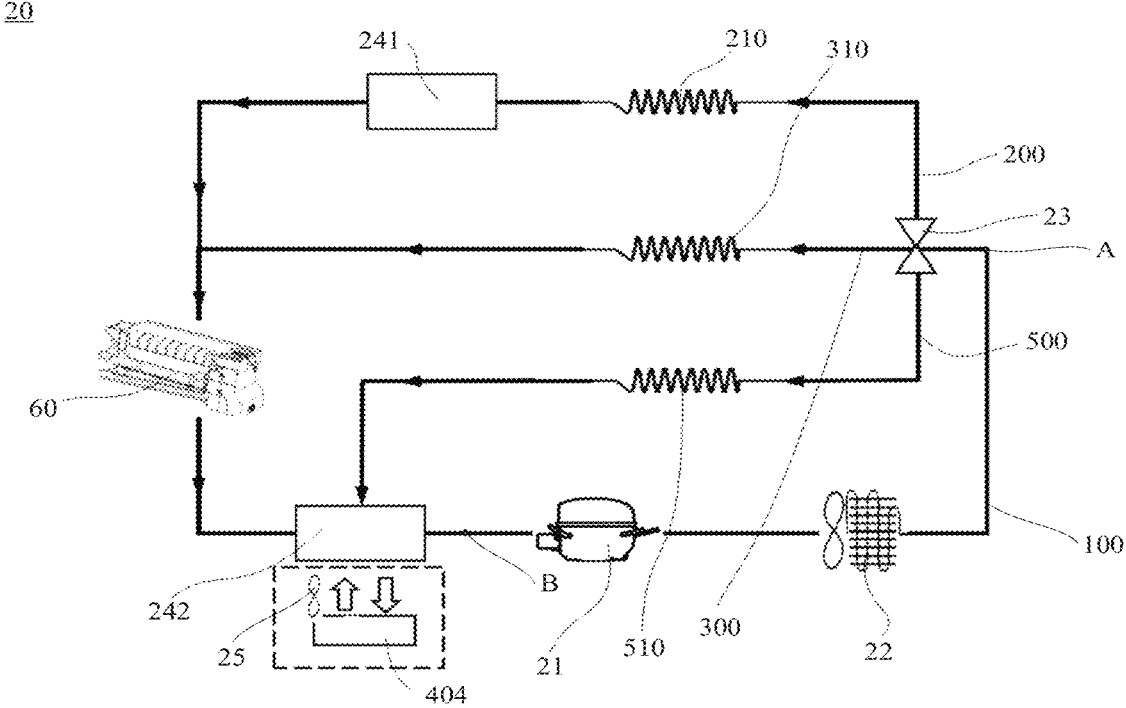
FIG. 9 is a schematic diagram of yet another refrigeration cycle system in a refrigerator, in accordance with some embodiments.

In some embodiments, as shown in FIG. 9, the ice maker 60 in the ice making flow path 300 is located on a downstream side of the refrigerating flow path 200. Compared with FIG. 7, the refrigerant inlet end of the ice maker 60 in FIG. 9 is connected to the refrigerant outlet end of the second evaporator 241 in the refrigerating flow path 200. In this way, a part of cold of the refrigerant in the refrigerating flow path 200 may be used to cool the ice maker 60.

In this case, in a case where the ice making is performed, the controller 90 controls the compressor 21, the condenser 22, and the ice maker 60 to start, and controls the switching valve group 23 to be at the first position P1, so that the refrigerating flow path 200 communicates with the transport flow path 100, so as to cool the second sub-chamber 401. In a case where the temperature in the second sub-chamber 401 decreases to the second preset temperature, the controller 90 controls the switching valve group 23 to be at the second position P2, so that the refrigerating flow path 200 is disconnected from the transport flow path 100, and the ice making flow path 300 communicates with the transport flow path 100 for making ice.

As shown in FIG. 9, the refrigeration cycle system 20 includes three kinds of refrigerant flow routes.

A first refrigerant flow route includes an order of the compressor 21, the condenser 22, the switching valve group 23, the third throttling device 210, the second evaporator 241, the ice maker 60, the first evaporator 242, and the compressor 21. Such route may achieve the cooling of the second sub-chamber 401. Moreover, the second evaporator 241 is located on the same flow path as the ice maker 60 and the first evaporator 242. In this way, in a case where the refrigerant flows in the route, the refrigerant may cool the corresponding components (e.g., the second evaporator 241, the ice maker 60 or the first evaporator 242) in the refrigeration cycle system 20.

A second refrigerant flow route includes an order of the compressor 21, the condenser 22, the switching valve group 23, the first throttling device 310, the ice maker 60, the first evaporator 242, and the compressor 21. In a case where the refrigerant flows in the route, the refrigerant may cool the ice maker 60 and the first sub-chamber 402, and the ice making efficiency of the ice maker 60 is relatively high.

A third refrigerant flow route includes an order of the compressor 21, the condenser 22, the switching valve group 23, the second throttling device 510, the first evaporator 242, and the compressor 21. Such route may cool the first sub-chamber 402 and the third sub-chamber 404. In a case where the first sub-chamber 402 has a cooling demand while the ice maker 60 has no cooling demand or the ice maker 60 is closed, the refrigerant flows according to the route.

It may be seen that the first refrigerant flow route and the second refrigerant flow route may achieve the cooling of the ice maker 60. Moreover, it is possible to achieve the switching between the first refrigerant flow route and the second refrigerant flow route through the switching valve group 23. In this way, the ice maker 60 may make ice while refrigerating cooling is performed through the first refrigerant flow route, and all refrigerant may be used for the ice maker 60 to make ice by switching to the second refrigerant flow route in time after the refrigerating cooling is finished, thereby improving the ice making efficiency of the ice maker 60.

In some embodiments, in a case where the temperature in the second sub-chamber 401 is greater than or equal to a third preset temperature, the controller 90 controls the switching valve group 23 to be at the first position P1, so that the refrigerating flow path 200 communicates with the transport flow path 100, so as to prevent the deterioration of the items stored in the second sub-chamber 401 due to the high temperature of the second sub-chamber 401.

It will be noted that the third preset temperature may be higher than the start-up cooling preset temperature of the second sub-chamber 401. For example, the start-up cooling preset temperature of the second sub-chamber 401 is 1° C., and the third preset temperature may be 2° C.

In some embodiments, as shown in FIG. 5, the ice maker 60 includes two independent refrigerant pipes 400. The refrigerating flow path 200 and the ice making flow path 300 may be connected to inlet ends of the two refrigerant pipe 400, respectively, and outlet ends of the two refrigerant pipes 400 are connected to the refrigerant return end B, so that the ice maker 60 may communicate with the refrigerating flow path 200 and the ice making flow path 300. In this case, there is no need to provide the switching valve group 23, as a result, the structure of the refrigerator 1 may be simplified. It will be noted that the ice maker 60 may also include three, four, or more refrigerant pipes 400 independently arranged with each other, and the present disclosure is not limited thereto. The more refrigerant pipes 400 are independently arranged with each other, the more cooling flow paths may be provided. As a result, it is possible to prevent a plurality of cooling flow paths from affecting the ice making of the ice maker 60 while the functions of the refrigerator 1 are expanded.

In the refrigerator 1 provided by some embodiments of the present disclosure, when the refrigerator 1 starts to make ice, the cooling demand of the second sub-chamber 401 is given priority. When the temperature in the second sub-chamber 401 decreases to the second preset temperature, the controller 90 controls the switching valve group 23, so as to make the refrigerating flow path 200 be disconnected from the transport flow path 100 and the ice making flow path 300 communicate with the transport flow path 100, so that the ice maker 60 may make ice. In this way, during the ice making process of the ice maker 60, there is no need for the refrigerant to be supplied to the second sub-chamber 401 for cooling, so as to avoid affecting the ice making process of the ice maker 60. Moreover, the refrigerant is mainly supplied to the ice making flow path 300, so that the ice maker 60 may maintain a low temperature for ice making, which is conducive to improving the ice making efficiency.

It will be noted that, the temperature of the refrigerant flowing into the ice maker 60 from the refrigerating flow path 200 after the refrigerant cools the second sub-chamber 401 is less than the temperature in the ice maker 60, so that the cold of the refrigerant may be used for cooling of the ice maker 60.

During the ice making process of the ice maker 60, there is no need to cool the second sub-chamber 401 within about 40 minutes. That is to say, there is no need for the refrigerant to flow through the refrigerating flow path 200 within about 40 minutes. Therefore, the refrigerant may be mainly supplied to the ice making flow path 300, so that the refrigerant may continuously cool the ice maker 60.

After ice cubes have been made, the ice maker 60 performs the ice scraping action. In this case, if the cooling flow paths have no cooling demand, the compressor 21 is closed. An ice making cycle includes water injection, ice making, and ice scraping. After the ice scraping ends, one ice making cycle ends, the compressor 21 is restarted, and the second sub-chamber 401 is first cooled. When the temperature in the second sub-chamber 401 reaches the second preset temperature (e.g., −1° C. or 0° C.), the second sub-chamber 401 is stopped being cooled, so that the temperature in the second sub-chamber 401 increases until a next ice making process ends and the compressor 21 is restarted, the second sub-chamber 401 may be cooled again. In this way, the refrigerant may continuously cool the ice maker 60, which is conducive to improving the ice making efficiency.

The above is mainly described that the ice maker 60 is located on the upstream side of the first evaporator 242 with reference to FIGS. 7 and 9. However, the present disclosure is not limited thereto.

Figure 10:
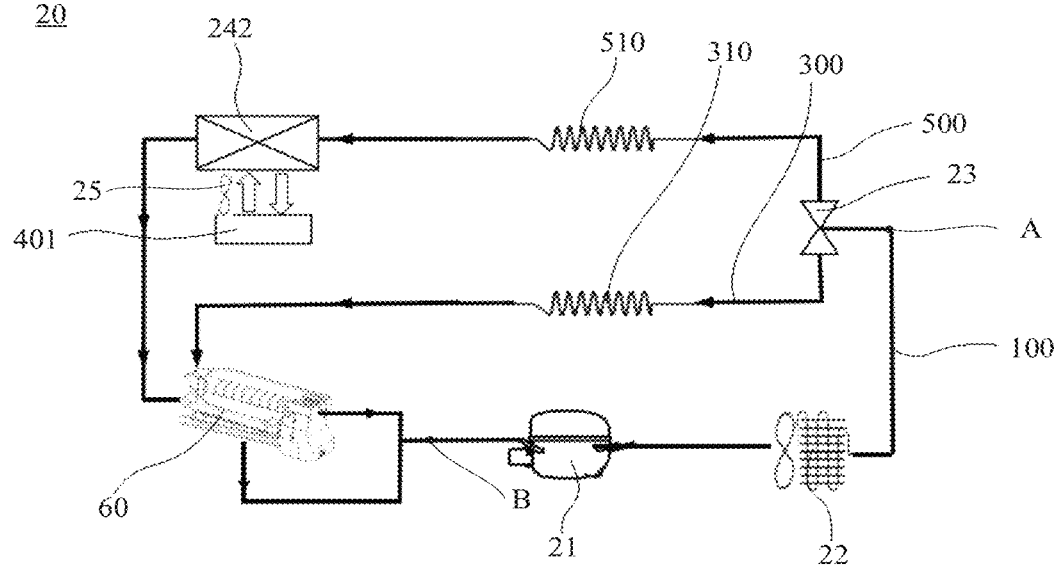
FIG. 10 is a schematic diagram of yet another refrigeration cycle system in a refrigerator, in accordance with some embodiments.

In some embodiments, as shown in FIG. 10, the first evaporator 242 is located on the same flow path as the ice maker 60, and the ice maker 60 is located on a downstream side of the first evaporator 242.

In this case, the ice maker 60 includes two independent refrigerant pipes 400. Outlet ends of the two refrigerant pipes 400 are connected to the refrigerant return end B. An inlet end of a refrigerant pipe 400 is connected to the another end of the freezing flow path 500 (i.e., the refrigerant outlet end of the first evaporator 242), and an inlet end of another refrigerant pipe 400 is connected to the another end of the first throttling device 310 in the ice making flow path 300. Any one of the ice making flow path 300 and the freezing flow path 500 may cool the ice maker 60.

Compared with FIGS. 7 and 9, the first evaporator 242 in FIG. 10 is located on the upstream side of the ice maker 60, and the ice maker 60 includes two independent refrigerant pipes 400 corresponding to the freezing flow path 500 and the ice making flow path 300, respectively. By providing the first evaporator 242 on the upstream side of the ice maker 60, it is possible to use the remaining cold of the refrigerant flowing through the first evaporator 242 to cool the ice maker 60, so as to improve the cooling efficiency of the refrigerator 1. It will be noted that, in a case where the first evaporator 242 is located on the downstream side of the ice maker 60, the first evaporator 242 may use the cold of the refrigerant flowing through the ice maker 60 to perform cooling.

Of course, the refrigeration cycle system 20 in FIG. 10 may also include the refrigerating flow path 200.

Figure 11:
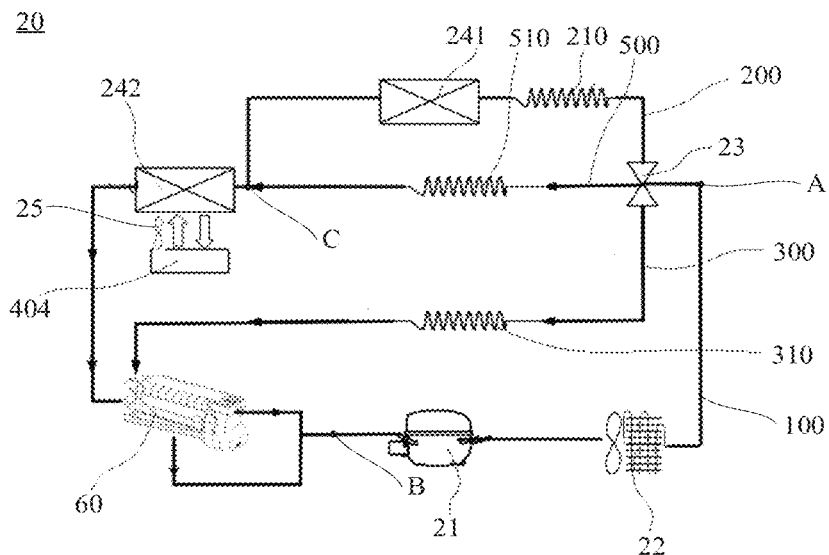
FIG. 11 is a schematic diagram of yet another refrigeration cycle system in a refrigerator, in accordance with some embodiments.

For example, as shown in FIG. 11, the end of the refrigerating flow path 200 is connected to the switching valve group 23, and the another end of the refrigerating flow path 200 is connected to a first node C of the freezing flow path 500.

It will be noted that the first node C is located between the second throttling device 510 and the first evaporator 242. For example, the first node C is located at the refrigerant inlet end of the first evaporator 242.

In this way, by connecting the another end of the refrigerating flow path 200 between the second throttling device 510 and the first evaporator 242, it is possible to make the transport flow path 100 supply refrigerant to the freezing flow path 500, so as to cool the first sub-chamber 402, and it is also possible to supply the refrigerant to the refrigerating flow path 200 to cool the second sub-chamber 401.

In this case, the method for cooling the third sub-chamber 404 through the first evaporator 242, reference may be made to the relevant description above, and details will not be repeated herein.

Of course, in some embodiments, the refrigerating flow path 200 in FIG. 10 may also be the variable temperature flow path 600.

For example, as shown in FIG. 12, the refrigeration cycle system 20 further includes the variable temperature flow path 600 configured to cool the third sub-chamber 404. The switching valve group 23 is provided on an upstream side of the variable temperature flow path 600. An end of the variable temperature flow path 600 is connected to the refrigerant discharge end A, and another end of the variable temperature flow path 600 is connected to the first node C of the freezing flow path 500.

The variable temperature flow path 600 includes a fourth throttling device 610 and a third evaporator 243 that are sequentially arranged in a flow direction of a refrigerant in the variable temperature flow path 600.

In this way, the transport flow path 100 may not only supply the refrigerant to the freezing flow path 500 to cool the first sub-chamber 402, but also supply the refrigerant to the variable temperature flow path 600 to cool the third sub-chamber 404. In this case, there is no need to cool the third sub-chamber 404 through the first evaporator 242.

Moreover, the first evaporator 242 is further configured to cool the second sub-chamber 401, so as to prevent the temperature in the second sub-chamber 401 from exceeding the third preset temperature.

For example, as shown in FIG. 12, the first sub-chamber 402 is provided with a first fan 25, and there is an air duct between the second sub-chamber 401 and the first sub-chamber 402, and the air duct is provided with an air door. The second sub-chamber 401 and the first sub-chamber 402 perform a cold cycle through the first fan 25 and the air duct, and the controller 90 controls the opening or closing of the air door, so as to open or close the air duct. The controller 90 controls the first fan 25 to transport the cold generated by the first evaporator 242 to the second sub-chamber 401 through the air duct, so as to cool the second sub-chamber 401 to ensure the temperature in the second sub-chamber 401, so that the refrigerant may pass through the first evaporator 242 to cool the second sub-chamber 401 and the first sub-chamber 402.

It will be noted that, as shown in FIG. 10, the second sub-chamber 401 may also be cooled through the cooperation of the first evaporator 242 and the first fan 25 in the first sub-chamber 402, and the process is similar to the cooling of the third sub-chamber 404 by using the first evaporator 242 described above, and the present disclosure is not limited thereto.

As shown in FIG. 10, since the ice maker 60 includes two refrigerant pipes 400, the refrigeration cycle system 20 includes two refrigerant flow routes independently arranged with each other. That is to say, the refrigeration cycle system 20 includes a fourth refrigerant flow route and a fifth refrigerant flow route.

The fourth refrigerant flow route includes an order of the compressor 21, the condenser 22, the switching valve group 23, the second throttling device 510, the first evaporator 242, the ice maker 60, and the compressor 21. In this case, compared with a manner in which the first evaporator 242 is located on the downstream side of each cooling flow path and is supplied with refrigerant by the plurality of cooling flow paths for cooling, the first evaporator 242 may occupy one cooling flow path alone for cooling the first sub-chamber 402. The first evaporator 242 may not only cool the first sub-chamber 402 but may also cool the second sub-chamber 401 or the third sub-chamber 404.

Moreover, in such route, the refrigerant flows into a refrigerant pipe 400 of the ice maker 60 after flowing out from the first evaporator 242 and returns to the compressor 21 after cooling the ice maker 60, so that ice may be made while the cooling demands of the sub-chambers are satisfied.

In addition, in a case where the refrigerant in the route supplies cold to the ice maker 60, the cold generated by the refrigerant may also cool the ice storage box 70, so as to store ice cubes. For example, the ice maker 60 has a second fan, and the second fan transports cold air around the refrigerant pipe 400 to the ice storage box 70, so as to maintain the temperature in the ice storage box 70.

The fifth refrigerant flow route includes an order of the compressor 21, the condenser 22, the switching valve group 23, the first throttling device 310, the ice maker 60, and the compressor 21. The refrigerant may flow along the route to meet the cooling demand of the ice maker 60.

The two refrigerant flow routes constitute the refrigeration cycle system 20, and the controller 90 controls the switching valve group 23 to selectively open or close the corresponding cooling flow path, which is conducive to improving the ice making efficiency.

Moreover, since the ice maker 60 may be cooled by at least one of the two cooling flow paths, the controller 90 may control the switching valve group 23 to disconnect the freezing flow path 500 from the transport flow path 100 during the ice making process, so that the first sub-chamber 402 is no longer passively cooled during the ice making process of the ice maker 60. The cooling process of the first sub-chamber 402 may not be affected by other cooling flow paths, which is conducive to controlling the temperature in the first sub-chamber 402, avoiding severe coldness of the first sub-chamber 402, reducing time during which the first sub-chamber 402 is at the low temperature, and shortening defrosting time and save energy consumption.

In addition, in a case where the first evaporator 242 needs defrosting, the controller 90 controls the switching valve group 23 to disconnect the transport flow path 100 from the freezing flow path 500 and make the transport flow path 100 communicate with the ice making flow path 300. In this case, the first evaporator 242 stops operating and the ice maker 60 may continue making ice. As a result, there is no need for the refrigeration cycle system 20 to stop operating, which is conducive to improving the ice making efficiency of the ice maker 60. Moreover, in a case where there are many ice cubes stored in the ice storage box 70, the controller 90 may control the switching valve group 23 to selectively close or open the corresponding cooling flow path, so as to save energy consumption.

In the ice maker 60 provided by some embodiments of the present disclosure, by providing two independent refrigerant pipes 400 and controlling the two independent refrigerant pipes 400 to perform cooling in a time-division manner or at the same time, the ice maker 60 may make ice normally in three different cases such as freezing, defrosting, and freezing and ice making.

In some embodiments, the switching valve group 23 may switch among a third position P3 (i.e., a first target position), a fourth position P4 (i.e., a second target position), and a fifth position P5 (i.e., a third target position).

In a case where the switching valve group 23 is at the third position P3, the refrigerant discharge end A of the transport flow path 100 communicates with the freezing flow path 500 and the ice making flow path 300. In this case, the refrigerant may flow along the two refrigerant flow routes (e.g., the fourth refrigerant flow route and the fifth refrigerant flow route).

In a case where the switching valve group 23 is at the fourth position P4, the refrigerant discharge end A of the transport flow path 100 communicates with the freezing flow path 500, and the refrigerant discharge end A of the transport flow path 100 is disconnected from the ice making flow path 300. In this case, the refrigerant flows along the fourth refrigerant flow route.

In a case where the switching valve group 23 is at the fifth position P5, the refrigerant discharge end A of the transport flow path 100 communicates with the ice making flow path 300, and the refrigerant discharge end A of the transport flow path 100 is disconnected from the freezing flow path 500. In this case, the refrigerant flows along the fifth refrigerant flow route.

In a case where the first evaporator 242 in the freezing flow path 500 needs defrosting and the ice maker 60 has an ice making demand, the controller 90 controls the switching valve group 23 to be at the fifth position P5. In this way, in a case where the first evaporator 242 defrosts, the ice maker 60 may continue making ice.

In a case where there is no need for the first evaporator 242 in the freezing flow path 500 to defrost, and the amount of the required ice cubes is greater than or equal to a first threshold and less than or equal to a maximum ice storage amount of the ice storage box 70, the controller 90 controls the switching valve group 23 to be at the third position P3, so that the ice maker 60 may have the maximum ice making efficiency.

The first threshold is a preset threshold. For example, the first threshold is two-thirds of the maximum ice storage amount of the ice storage box 70. It will be noted that the maximum ice storage amount may be volume, number or quality of ice cubes stored in the ice storage box 70.

In a case where there is no need for the first evaporator 242 in the freezing flow path 500 to defrost, and the amount of the required ice cubes is greater than or equal to a second threshold and less than the first threshold, the controller 90 controls the switching valve group 23 to be at the fifth position P5.

The second threshold is a preset threshold, and the second threshold is less than the first threshold. For example, the second threshold is one third of the maximum ice storage amount of the ice storage box 70.

In a case where there is no need for the first evaporator 242 in the freezing flow path 500 to defrost, and the amount of the required ice cubes is less than the second threshold, the controller 90 controls the switching valve group 23 to be at the fourth position P4, so as to satisfy the minimum cooling demand of the ice maker 60, maintain the temperature in the ice storage box 70, and save energy.

In some embodiments, in a case where the temperature in the first sub-chamber 402 reaches a fourth preset temperature (i.e., a target preset temperature) and the ice maker 60 has an ice making demand, the controller 90 controls the switching valve group 23 to be at the fifth position P5, so as to solve a problem that the first sub-chamber 402 is passively cooled during the ice making process of the ice maker 60.

It will be noted that the fourth preset temperature may be less than a shutdown cooling preset temperature of the first sub-chamber 402. For example, the shutdown cooling preset temperature of the first sub-chamber 402 is −1° C., and the fourth preset temperature may be −2° C.

After the refrigerator 1 is started, the controller 90 determines the amount of the required ice cubes according to the amount of the ice cubes in the ice storage box 70. Generally, the amount of the ice cubes in the ice storage box 70 is greater than or equal to 80% of the maximum ice storage amount of the ice storage box 70. In a case where the amount of the ice cubes in the ice storage box 70 is less than 80% of the maximum ice storage amount of the ice storage box 70, the controller 90 controls the ice maker 60 to start to make ice.

In some embodiments, the refrigerator 1 includes at least one of an ice measuring rod or an infrared sensor. The ice measuring rod or the infrared sensor is configured to detect the amount of ice cubes in the ice storage box 70, and at least one of the ice measuring rod or the infrared sensor is coupled to the controller 90. The amount of ice cubes in the ice storage box 70 may be determined by the at least one of the ice measuring rod or the infrared sensor and then fed back to the controller 90.

For example, the ice measuring rod is located above the ice storage box 70. The controller 90 controls the ice measuring rod to move downwards, so that the ice measuring rod may touch the ice cubes in the ice storage box 70. In this case, the ice measuring rod stops moving, and the controller 90 determines the current amount of ice cubes stored in the ice storage box 70 by reading a moving distance of the ice measuring rod or a downward rotation angle of the ice measuring rod.

For another example, a plurality of pairs of infrared sensors are provided in the ice storage box 70. The plurality of pairs of infrared sensors are arranged in sequence in a height direction of the ice storage box 70. Each pair of infrared sensors are arranged opposite to each other in a horizontal direction, and the plurality of pairs of infrared sensors are arranged at the positions corresponding to different ice storage amount (e.g., one-third of the maximum ice storage amount of the ice storage box 70, two-thirds of the maximum ice storage amount of the ice storage box 70, or the maximum ice storage amount of the ice storage box 70) of the ice storage box 70. In a case where the ice cubes in the ice storage box 70 exceed a position where a pair of infrared sensors are located, the ice cubes in the ice storage box 70 block the infrared rays transmitted between the pair of infrared sensors. Since the controller 90 is coupled to the infrared sensors, the controller 90 may detect the corresponding signal, so that the controller 90 may determine the position of the corresponding pair of infrared sensors according to the signal, thereby determining the current amount of ice cubes in the ice storage box 70.

The above description is mainly given by considering an example in which the refrigeration cycle system 20 includes one compressor 21. However, the present disclosure is not limited thereto.

In some embodiments, the refrigeration cycle system 20 may also include a plurality of compressors 21, correspondingly, the ice maker 60 includes a plurality of refrigerant pipes 400 independently arranged with each other. The plurality of refrigerant pipes 400 are arranged corresponding to the plurality of compressors 21, respectively.

Figure 13:
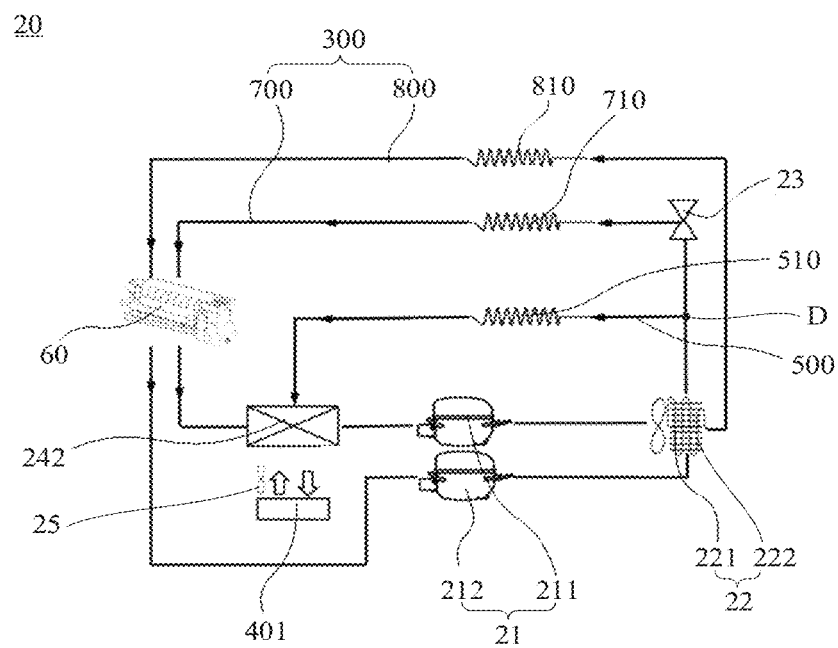
FIG. 13 is a schematic diagram of yet another refrigeration cycle system in a refrigerator, in accordance with some embodiments.

For example, as shown in FIG. 13, the plurality of compressors 21 include a first compressor 211 and a second compressor 212. The condenser 22 in the refrigeration cycle system 20 includes a first condenser 221 and a second condenser 222. The ice making flow path 300 includes a first ice making flow sub-path 700 and a second ice making flow sub-path 800. Moreover, the ice maker 60 includes two refrigerant pipes 400 independently arranged with each other.

Figure 14:
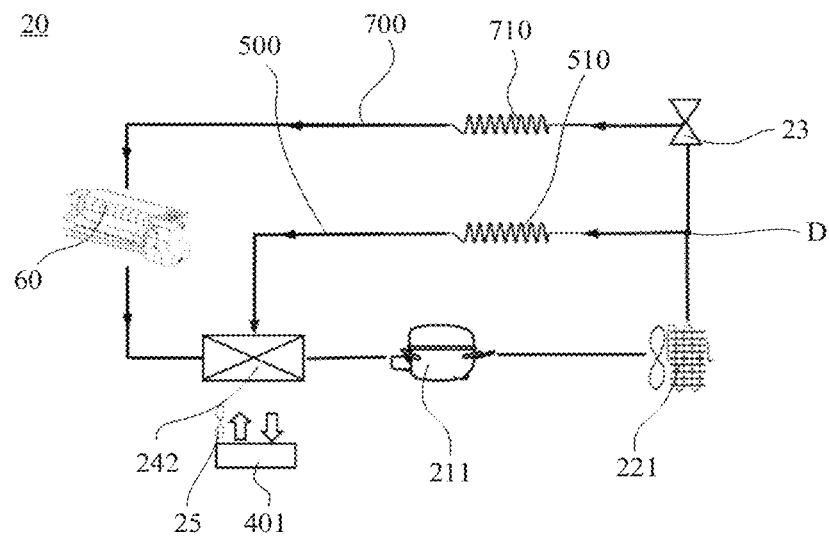
FIG. 14 is a schematic diagram of a first ice making flow sub-path in a refrigerator, in accordance with some embodiments.
Figure 15:
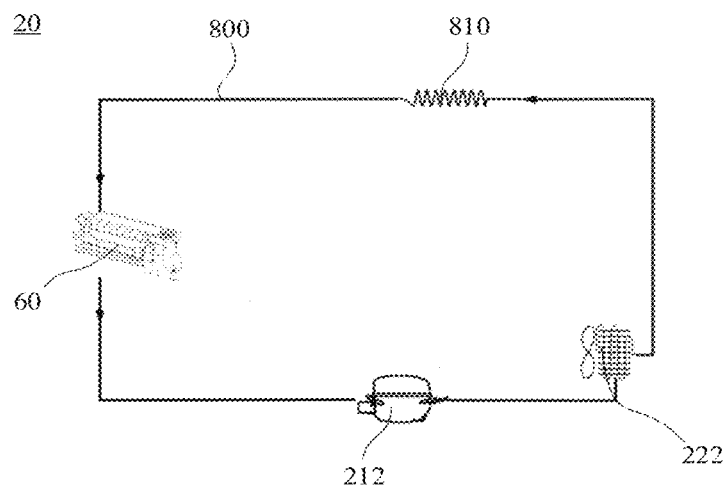
FIG. 15 is a schematic diagram of a second ice making flow sub-path in a refrigerator, in accordance with some embodiments.

In this case, as shown in FIGS. 13 and 14, the first ice making flow sub-path 700 includes a first throttling sub-device 710. In the first ice making flow sub-path 700, the first compressor 211, the first condenser 221, the first throttling sub-device 710, and a refrigerant pipe 400 of the ice maker 60 are sequentially arranged in a flow direction of the refrigerant. As shown in FIGS. 13 and 15, the second ice making flow sub-path 800 includes a second throttling sub-device 810. In the second ice making flow sub-path 800, the second compressor 212, the second condenser 222, the second throttling sub-device 810, and another refrigerant pipe 400 of the ice maker 60 are sequentially arranged in a flow direction of the refrigerant.

As shown in FIGS. 13 and 14, the first ice making flow sub-path 700 is configured to cool the ice maker 60. A refrigerant outlet end of the first compressor 211 is connected with a refrigerant inlet end of the first condenser 221. An end of the first throttling sub-device 710 is connected with a refrigerant outlet end of the first condenser 221, and another end of the first throttling sub-device 710 is connected with an inlet end of a refrigerant pipe 400 in the ice maker 60. An outlet end of the refrigerant pipe 400 is connected to a refrigerant inlet end of the first compressor 211.

As shown in FIGS. 13 and 15, the second ice making flow sub-path 800 is configured to cool the ice maker 60. A refrigerant outlet end of the second compressor 212 is connected with a refrigerant inlet end of the second condenser 222. An end of the second throttling sub-device 810 is connected to a refrigerant outlet end of the second condenser 222, and another end of the second throttling sub-device 810 is connected to an inlet end of another refrigerant pipe 400 in the ice maker 60. An outlet end of the another refrigerant pipe 400 is connected to a refrigerant inlet end of the second compressor 212.

In some embodiments, as shown in FIG. 13, the end (i.e., the refrigerant inlet end of the second throttling device 510) of the freezing flow path 500 is connected to the refrigerant outlet end of the first condenser 221, and the another end (i.e., the refrigerant outlet end of the first evaporator 242) of the freezing flow path 500 is connected to the refrigerant inlet end of the first compressor 211. The refrigerant inlet end of the second throttling device 510 is connected to a second node D.

It will be noted that the second node D is located between the first throttling sub-device 710 and the first condenser 221. The freezing flow path 500 is connected in parallel with the first ice making flow sub-path 700, so that a portion of the refrigerant flowing through the first ice making flow sub-path 700 may flow into the freezing flow path 500, and the first sub-chamber 402 may be cooled while the ice maker 60 is cooled.

In some embodiments, as shown in FIG. 13, the first evaporator 242 is located between the ice maker 60 and the first compressor 211. The outlet end of the refrigerant pipe 400 in the first ice making flow sub-path 700 is connected to the refrigerant inlet end of the first evaporator 242. Therefore, the refrigerant passing through the ice maker 60 may also flow into the first evaporator 242 for heat exchange, so as to cool the first sub-chamber 402, thereby improving the utilization efficiency of the refrigerant.

In some embodiments, as shown in FIG. 13, the first condenser 221 in the first ice making flow sub-path 700 and the second condenser 222 in the second ice making flow sub-path 800 may be a same condenser 22. The refrigerant outlet end of the first compressor 211 and the refrigerant outlet end of the second compressor 212 each are connected to the refrigerant inlet end of the condenser 22. By using one condenser 22 as the first condenser 221 and the second condenser 222 in the two cooling flow paths, it is conducive to arranging the refrigeration cycle system 20, reducing the number of components, reducing costs, and reducing the space occupied by the refrigeration cycle system 20.

In some embodiments, as shown in FIGS. 13 and 14, the switching valve group 23 is located between the first throttling sub-device 710 and the second node D. The switching valve group 23 is configured to make the first throttling sub-device 710 communicate with or be disconnected from the first condenser 221. In a case where the ice maker 60 has no cooling demand, the controller 90 may control the switching valve group 23 to disconnect a flow path where the first throttling sub-device 710 is located, so as to close the first ice making flow sub-path 700, thereby solving a problem that the freezing flow path 500 is unable to be cooled due to the shutdown of the first compressor 211.

In some embodiments, as shown in FIGS. 13 and 14, the first evaporator 242 is further configured to cool the second sub-chamber 401. The cooling method of the second sub-chamber 401 by the first evaporator 242 is the same as that described above, and details will not be repeated herein.

As shown in FIGS. 13 and 14, a refrigerant flow route of the freezing flow path 500 includes an order of the first compressor 211, the condenser 22, the second throttling device 510, the first evaporator 242, and the first compressor 211. In this case, since the first ice making flow sub-path 700 is closed by the switching valve group 23, the first evaporator 242 occupies a single cooling flow path to cool the first sub-chamber 402. Moreover, the freezing flow path 500 may cool the first sub-chamber 402 and the second sub-chamber 401 through the first evaporator 242 simultaneously.

A refrigerant flow route of the first ice making flow sub-path 700 includes an order of the first compressor 211, the condenser 22, the switching valve group 23, the first throttling sub-device 710, the ice maker 60, the first evaporator 242, and the first compressor 211. The first ice making flow sub-path 700 may cool the ice maker 60, the first sub-chamber 402, and the second sub-chamber 401. After flowing into the ice maker 60 for cooling through the first throttling sub-device 710, the refrigerant flows into the first evaporator 242, so as to cool the first sub-chamber 402 and the second sub-chamber 401.

A refrigerant flow route of the second ice making flow sub-path 800 includes an order of the second compressor 212, the condenser 22, the second throttling sub-device 810, the ice maker 60, and the second compressor 212. Since the refrigerant flowing through the second ice making flow sub-path 800 only cools the ice maker 60, the ice making efficiency of the ice maker 60 corresponding to the second ice making flow sub-path 800 is higher than the ice making efficiency of the ice maker 60 corresponding to the first ice making flow sub-path 700 in a case of same amount of refrigerant.

In a case where the amount of the required ice cubes is greater than a third threshold and less than or equal to the maximum ice storage amount of the ice storage box 70, the controller 90 controls the opening of the first ice making flow sub-path 700 and the second ice making flow sub-path 800, and controls the closing of the freezing flow path 500.

The third threshold is a preset threshold. For example, the third threshold is half of the maximum ice storage amount of the ice storage box 70.

In a case where the amount of the required ice cubes is less than or equal to the third threshold and the first sub-chamber 402 has a cooling demand, the controller 90 controls the opening of the freezing flow path 500 and the first ice making flow sub-path 700, and controls the closing of the second ice making flow path 800.

In a case where the amount of the required ice cubes is less than or equal to the third threshold and the first sub-chamber 402 has no cooling demand, the controller 90 controls the opening of the second ice making flow sub-path 800, and controls the closing of the first ice making flow sub-path 700 and the freezing flow path 500.

In a case where there is no ice making demand, the controller 90 controls the switching valve group 23 to close the first ice making flow sub-path 700 and controls the second compressor 212 to be closed. In this case, the controller 90 controls the freezing flow path 500 to start or close according to the temperature in the first sub-chamber 402.

In the refrigerator 1 provided by some embodiments of the present disclosure, the first ice making flow sub-path 700 and the second ice making flow sub-path 800 are provided with the first compressor 211 and the second compressor 212, respectively. Since the refrigerant in the first ice making flow sub-path 700 and the second ice making flow sub-path 800 passes through the ice maker 60 separately, the two ice making flow sub-paths each may provide refrigerant for the ice maker 60, or jointly provide refrigerant for the ice maker 60.

In a case where the ice making demand is not high (e.g., a case where the amount of the required ice cubes is less than or equal to the third threshold), any one of the first ice making flow sub-path 700 and the second ice making flow sub-path 800 may be selected to provided refrigerant for the ice maker 60, so as to reduce energy consumption and save energy while the ice making demand is satisfied.

In a case where the ice making demand is high (e.g., a case where the amount of the required ice cubes is greater than the third threshold and less than or equal to the maximum ice storage amount of the ice storage box 70), the first ice making flow sub-path 700 and the second ice making flow sub-path 800 jointly provide refrigerant for the ice maker 60, thereby improving the ice making effect of the ice maker 60. In addition, even if one of the two compressors (211, 212) fails, the ice maker 60 may still operate normally, which improves the ice making stability of the ice maker 60.

The ice maker 60 according to some embodiments of the present disclosure will be described in detail below.

Figure 16:
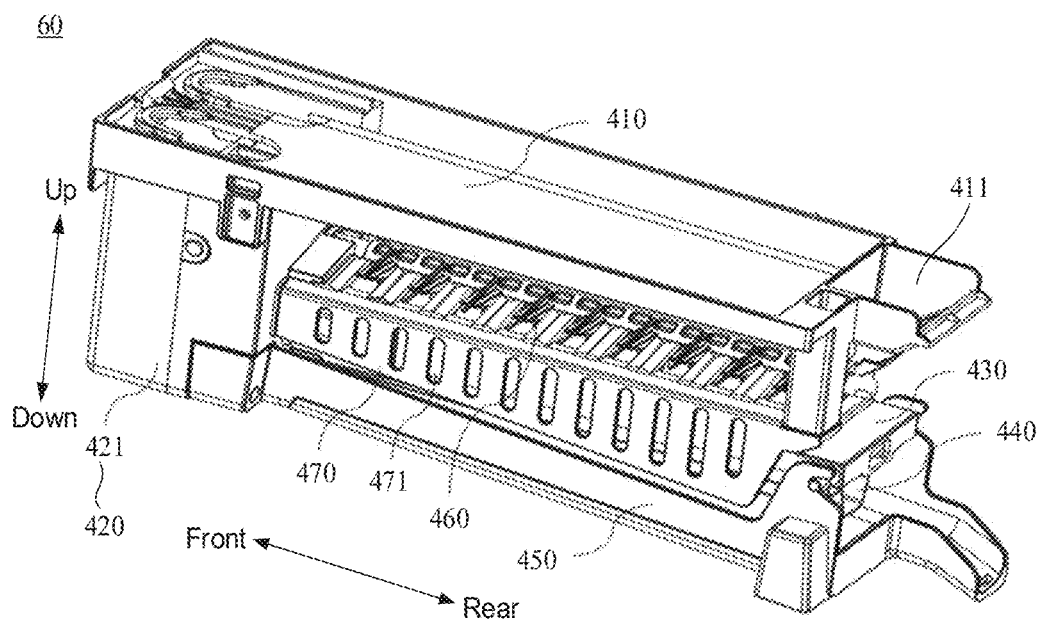
FIG. 16 is a diagram showing a structure of an ice maker, in accordance with some embodiments.

As shown in FIGS. 3 and 16, the ice maker 60 includes a refrigerant pipe 400. The refrigerant pipe 400 is configured to cool the ice maker 60. An end of the refrigerant pipe 400 is connected to the refrigerant discharge end A of the transport flow path 100, and another end of the refrigerant pipe 400 is connected to the refrigerant return end B of the transport flow path 100.

In some embodiments, as shown in FIG. 3, the refrigerant pipe 400 includes a first extending segment 311 and a second extending segment 312. The first extending segment 311 is a segment of the refrigerant pipe 400 located in the fourth sub-chamber 403, the second extending segment 312 is a segment of the refrigerant pipe 400 located outside the fourth sub-chamber 403, and the second extending segment 312 communicates with the refrigeration cycle system 20.

Figure 17:
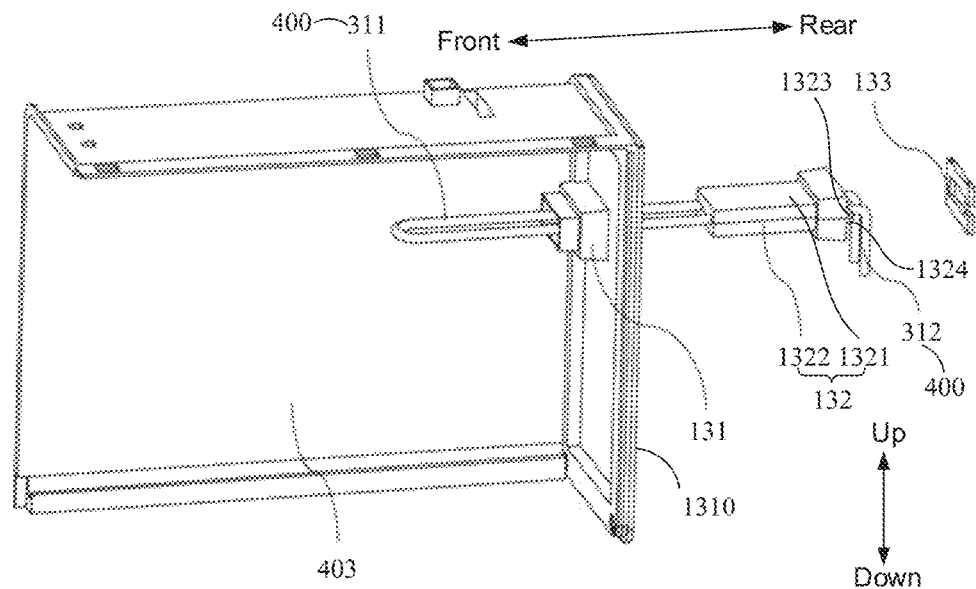
FIG. 17 is a diagram showing structures of a refrigerant pipe and a portion of a fourth sub-chamber, in accordance with some embodiments.

In some embodiments, as shown in FIG. 17, the ice maker 60 further includes a mating portion 132 disposed outside the refrigerant pipe 400 and connected to the refrigerant pipe 400. The fourth sub-chamber 403 has a limiting portion 131 matching with the mating portion 132, and the limiting portion 131 is disposed on the rear wall 1310 of the fourth sub-chamber 403. For example, as shown in FIG. 17, the mating portion 132 includes a first fit sub-portion 1321 and a second fit sub-portion 1322 connected with each other. A portion of the refrigerant pipe 400 is clamped between the first fit sub-portion 1321 and the second fit sub-portion 1322, and the mating portion 132 is inserted into the limiting portion 131, so as to be fixed with the limiting portion 131.

As shown in FIG. 17, the ice maker 60 further includes a fixing clip 133 connected to the rear wall 1310, and the mating portion 132 is located on a side (e.g., the front side) of the fixing clip 133 proximate to the rear wall 1310. The fixing clip 133 is configured to clamp the first fit sub-portion 1321 and the second fit sub-portion 1322, so that the first fit sub-portion 1321 and the second fit sub-portion 1322 are fixedly connected with each other. Moreover, the fixing clip 133 is also configured to limit the movement of the mating portion 132 in a direction (e.g., backward) away from the rear wall 1310, which is conducive to improving the fixing effect of the refrigerant pipe 400. For example, as shown in FIG. 17, a portion of the first fit sub-portion 1321 away from the rear wall 1310 protrudes, so as to form a first protrusion 1323. A portion of the second fit sub-portion 1322 away from the rear wall 1310 protrudes, so as to form a second protrusion 1324. The fixing clip 133 clamps the first protrusion 1323 and the second protrusion 1324, so as to fix the first fit sub-portion 1321 and the second fit sub-portion 1322.

Figure 18:
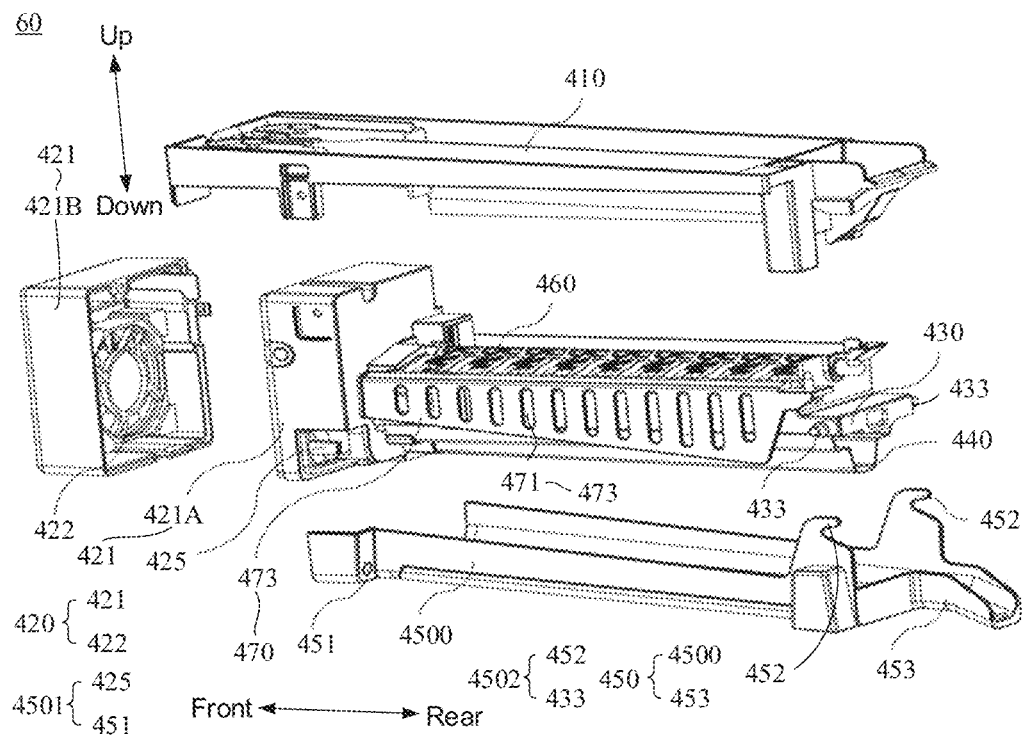
FIG. 18 is an exploded view of an ice maker, in accordance with some embodiments.
Figure 22:
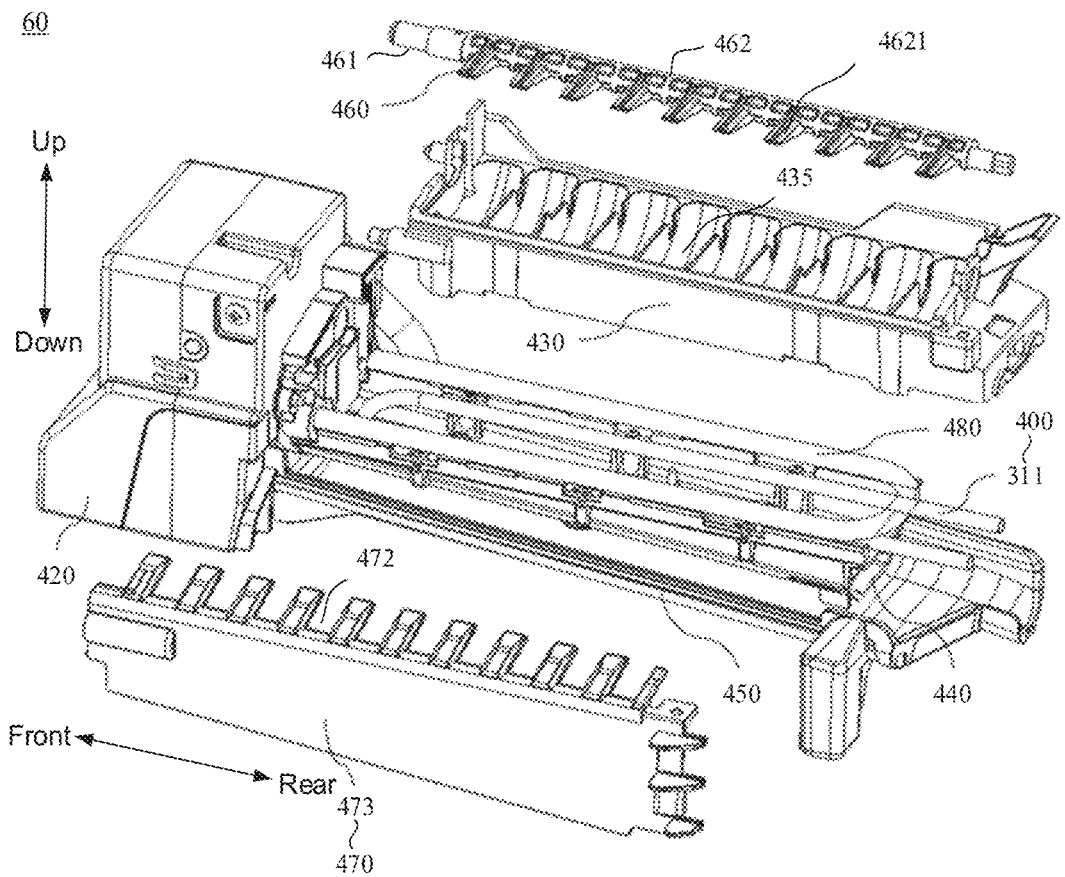
FIG. 22 is an exploded view of another ice maker, in accordance with some embodiments.

As shown in FIGS. 16 and 18, the ice maker 60 further includes a base 410, a fan assembly 420, an ice tray 430, a fixing plate 440, a water pan 450, a cover plate 470, and a heating tube 480 (as shown in FIG. 22).

As shown in FIGS. 3 and 16, the base 410 is detachably installed in the fourth sub-chamber 403 and is located on the top portion of the fourth sub-chamber 403. For example, the base 410 is connected to the fourth sub-chamber 403 by means of a buckle or a screw. The base 410 includes a water injecting inlet 411, and water from the water inlet pipe 930 may flow into the ice tray 430 through the water injecting inlet 411.

As shown in FIGS. 16 and 18, the fan assembly 420 is disposed on a side (e.g., a lower side) of the base 410 proximate to the ice storage box 70, and the fan assembly 420 is located on a side (e.g., a front side) of the base 410 proximate to the door body 30. A rear side of the fan assembly 420 may be an air suction side, and at least one of a front side, a lower side, a left side, or a right side of the fan assembly 420 may be an air outlet side.

Figure 19:
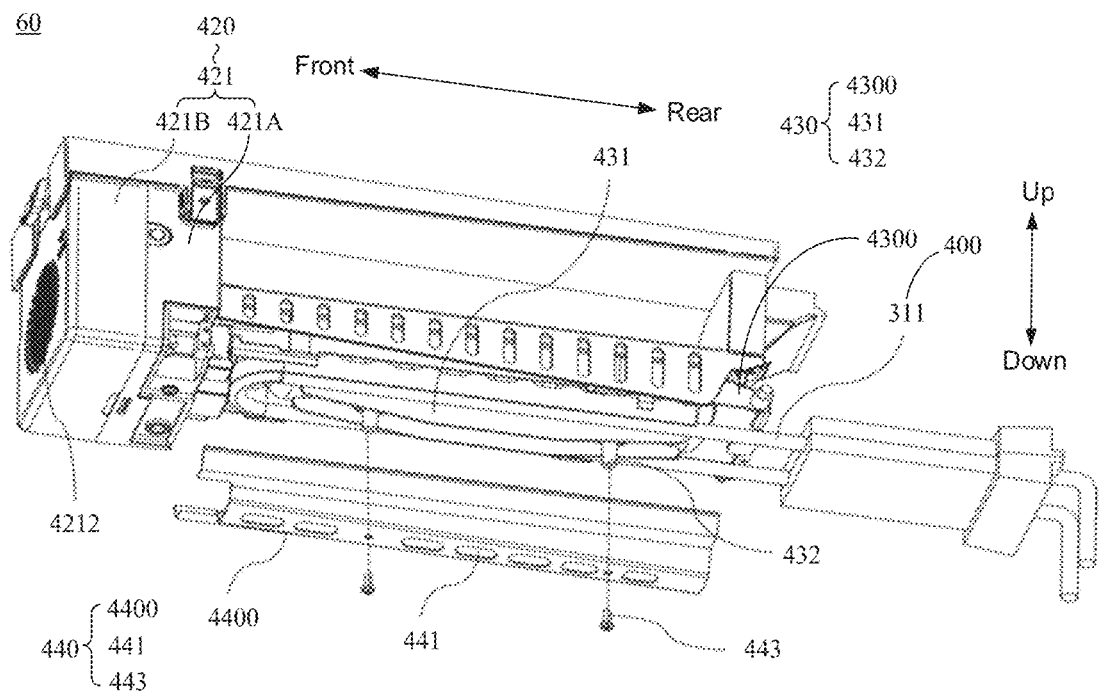
FIG. 19 is an exploded view of a local structure of an ice maker, in accordance with some embodiments.
Figure 20:
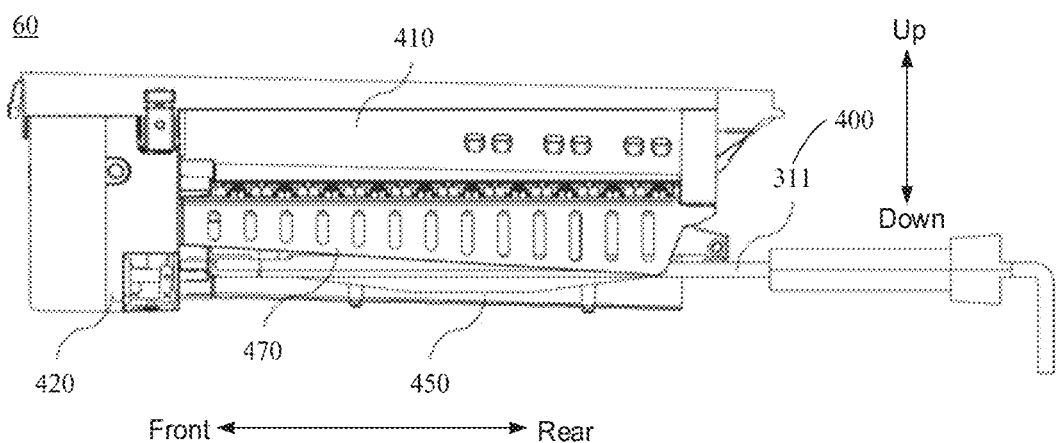
FIG. 20 is a diagram showing structures of an ice maker and a refrigerant pipe, in accordance with some embodiments.
Figure 21:
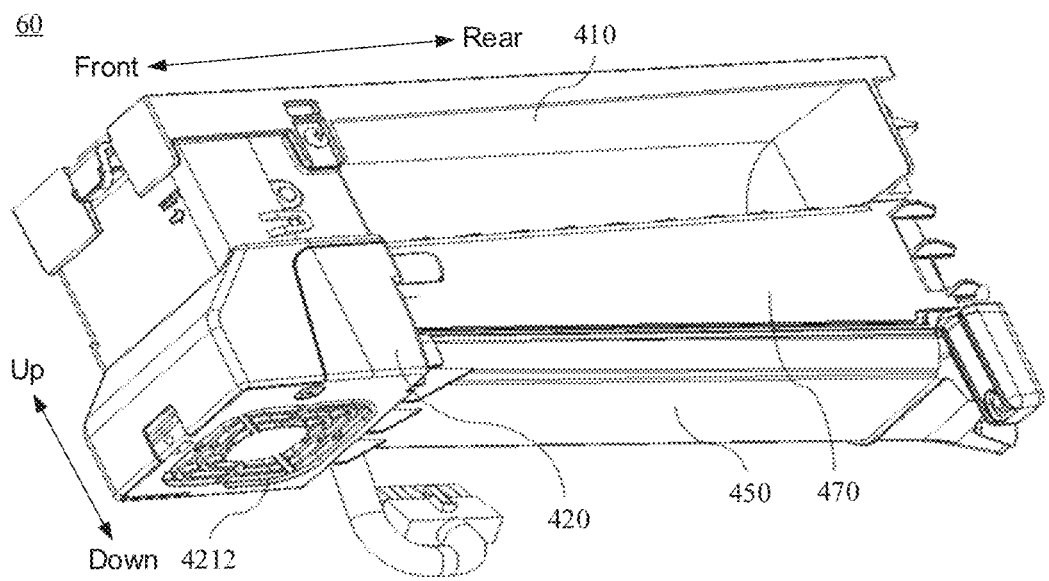
FIG. 21 is a diagram showing a structure of another ice maker, in accordance with some embodiments.
Figure 23:
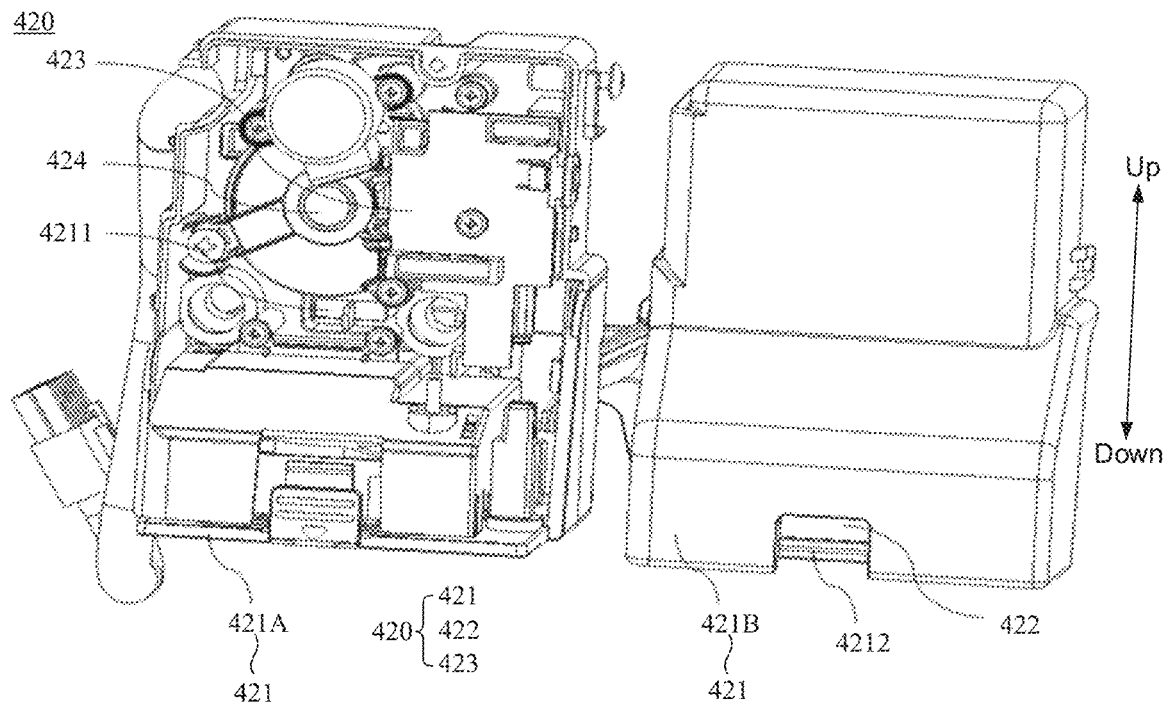
FIG. 23 is an exploded view of a fan assembly, in accordance with some embodiments.
Figure 24:
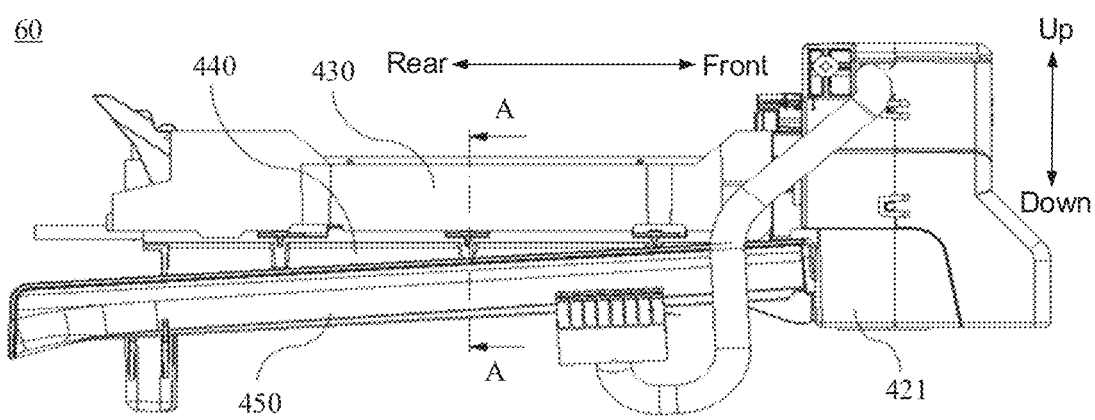
FIG. 24 is a side view of a local structure of another ice maker, in accordance with some embodiments.

For example, FIGS. 16, 18, and 19 show that the front side of the fan assembly 420 is the air outlet side, and FIGS. 21 to 23 show that the lower side of the fan assembly 420 is the air outlet side. In a case where the left or right side of the fan assembly 420 is the air outlet side, a structure of the fan assembly 420 is similar to that described above, and details will not be repeated herein. The fan assembly 420 may drive an air cycle in the fourth sub-chamber 403. The fan assembly 420 may be integrated with the ice maker 60, which is conducive to simplifying the structure.

As shown in FIGS. 18 and 23, the fan assembly 420 includes an outer casing 421, a second fan 422, and a control portion 423. The outer casing 421 is disposed on the lower side of the base 410 and is proximate to the front side of the base 410. The outer casing 421 includes a first sub-casing 421A and a second sub-casing 421B connected with each other. For example, the first sub-casing 421A and the second sub-casing 421B may be connected with each other by means of a buckle or a screw.

As shown in FIG. 23, the outer casing 421 is provided with an air suction portion 4211. The air at refrigerant pipe 400 is sucked into the fan assembly 420 through the air suction portion 4211. The air suction portion 4211 is located on a side (e.g., a rear side) of the outer casing 421 away from the door body 30. For example, the air suction portion 4211 is a through hole and disposed on a rear side of the first sub-casing 421A. As shown in FIGS. 18 and 19, the outer casing 421 is further provided with an air outlet portion 4212. The air sucked into the fan assembly 420 is discharged from the ice maker 60 through the air outlet portion 4212. The air outlet portion 4212 is located on a side (e.g., a front side) of the outer casing 421 proximate to the door body 30. For example, the air outlet portion 4212 is a through hole and disposed on a front side of the second sub-casing 421B. Alternatively, as shown in FIGS. 21 and 23, the air outlet portion 4212 may be disposed on a side (e.g., a lower side) of the outer casing 421 away from the base 410.

As shown in FIG. 18, the second fan 422 is disposed in the outer casing 421, so that the rear side of the outer casing 421 may be the air suction side. The control portion 423 is coupled to the second fan 422, and the control portion 423 includes a fan control portion configured to control the second fan 422 to be turned on or off, so as to control the second fan 422 to operate.

In some embodiments, as shown in FIGS. 16 and 18, the ice tray 430 is located at the rear side of the outer casing 421. For example, the ice tray 430 is located on the air suction side of the second fan 422. In this way, the fan assembly 420 may directly suck in cold air around the refrigerant pipe 400 and blow the cold air into the fourth sub-chamber 403, which facilitates an air cycle in the fourth sub-chamber 403.

Generally, the refrigerant pipe corresponding to the ice tray is located on the air outlet side of the fan of the ice maker. In a case where the fan of the ice maker operates, there is a negative pressure on the air suction side of the fan and a positive pressure on the air outlet side of the fan. Since the airflow at the negative pressure is concentrated while the airflow at the positive pressure is dispersed, the dispersed airflow on the air outlet side may flow into various positions (e.g., the inside or surface of the ice maker) of the ice maker or the components around the ice maker, which easily causes frosting on various positions of the ice maker or the components around the ice maker. However, in the ice maker 60 provided by some embodiments of the present disclosure, the ice tray 430 is located on the air suction side of the second fan 422, and airflow in a ventilation duct below the ice tray 430 is in a negative pressure environment. Therefore, the airflow in the ventilation duct below the ice tray 430 may be concentrated, and the airflow may be concentrated and flow to the second fan 422, so as to prevent the airflow from dispersing and causing the frosting on various positions inside the ice maker 60, the outer surface of the ice maker 60, and the components around the ice maker 60.

The ice tray 430 is made of a metal material with a high thermal conductivity (e.g., aluminum or aluminum alloy). Referring to FIG. 19, the ice tray 430 further includes a first body 4300 and a heat conducting sheet 431, and the heat conducting sheet 431 is disposed on a portion (e.g., a bottom portion) of the first body 4300 away from the base 410, so as to improve the heat exchange efficiency of the ice tray 430.

In some embodiments, as shown in FIG. 19, the first extending segment 311 of the refrigerant pipe 400 is in contact with a bottom portion of the ice tray 430 (e.g., the first body 4300), so that the cold of the refrigerant pipe 400 may be directly transferred to the ice tray 430 in a case where the ice maker 60 makes ice, thereby improving the ice making efficiency of the ice maker 60.

Figure 25:
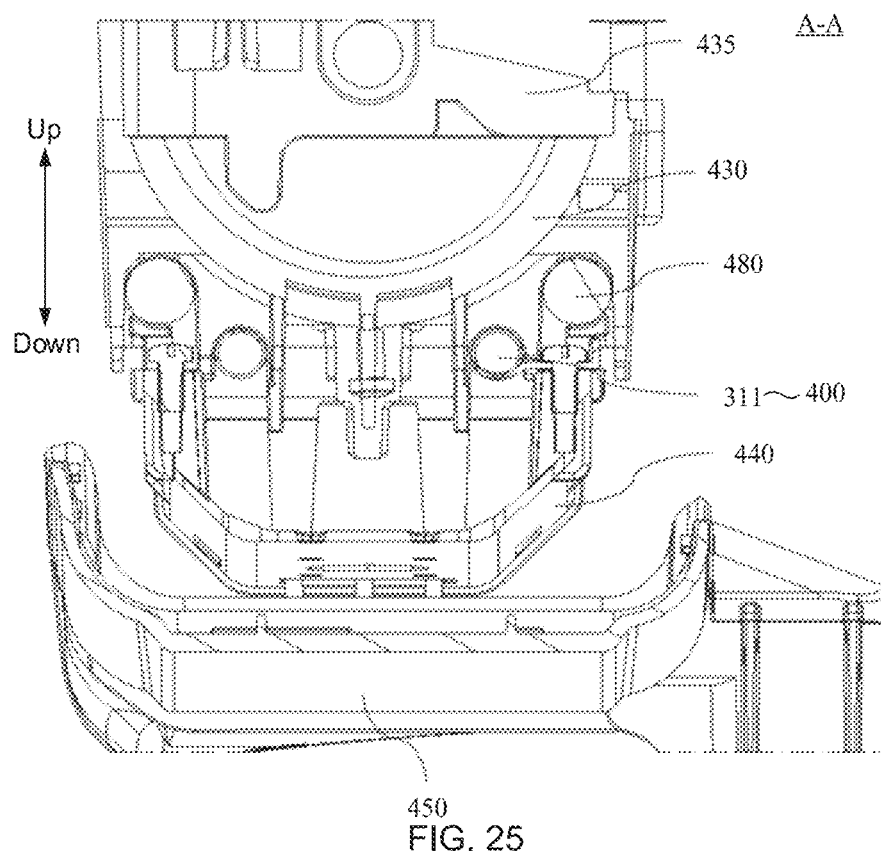
FIG. 25 is a sectional view taken along the line A-A in FIG. 24.

In some embodiments, referring to FIGS. 22 and 25, the first extending segment 311 of the refrigerant pipe 400 is substantially in a shape of a capital letter U, and the bottom portion of the ice tray 430 is provided with a groove in a shape of a capital letter U, so as to accommodate the first extending segment 311.

In some embodiments, referring to FIGS. 22 and 25, the heating tube 480 is disposed under the bottom portion of the ice tray 430, and is coupled to the control portion 423. The control portion 423 further includes a heating control portion configured to control the heating tube 480 to be turned on or off. As a result, the heating tube 480 is controlled to heat the ice tray 430 after the ice making is completed, so that bottom portions of the ice cubes in the ice tray 430 melt, which is conducive to demolding ice subsequently.

For example, the heating tube 480 is substantially in a shape of a capital letter U (i.e., U shaped), and an opening direction of the heating tube 480 in the shape of the capital letter U is opposite to an opening direction of the first extending segment 311 in the shape of the capital letter U. An orthogonal projection of a portion of the first extending segment 311 on a reference plane is located within an orthogonal projection of the heating tube 480 on the reference plane. The reference plane is parallel to a horizontal plane. In a height direction (i.e., the up-down direction in FIG. 22) of the ice maker 60, the heating tube 480 and the first extending segment 311 may be located at a same height or at different heights. For example, as shown in FIG. 25, the heating tube 480 is higher than the first extending segment 311.

It will be noted that, since a circuit structure for supplying power to the heating tube 480 is disposed in the fan assembly 420, the opening direction of the heating tube 480 in the shape of the capital letter U faces toward the fan assembly 420, which facilitates electrical connection between the heating tube 480 and the corresponding circuit structure.

In some embodiments, as shown in FIGS. 18 and 19, the fixing plate 440 is detachably connected to the bottom portion of the ice tray 430, so that the first extending segment 311 may be in close contact with the bottom portion of the ice tray 430, and the refrigerant pipe 400 may perform uniform cooling on the ice tray 430. Moreover, space between an inner surface of the fixing plate 440 and the bottom portion of the ice tray 430 constitutes the ventilation duct. In a front-rear direction of the ice maker 60. The ventilation duct corresponds to the air suction portion 4211 (as shown in FIG. 23), and the air suction portion 4211 communicates with the ventilation duct. It will be noted that the air suction portion 4211 is disposed on the air suction side.

Figure 27:
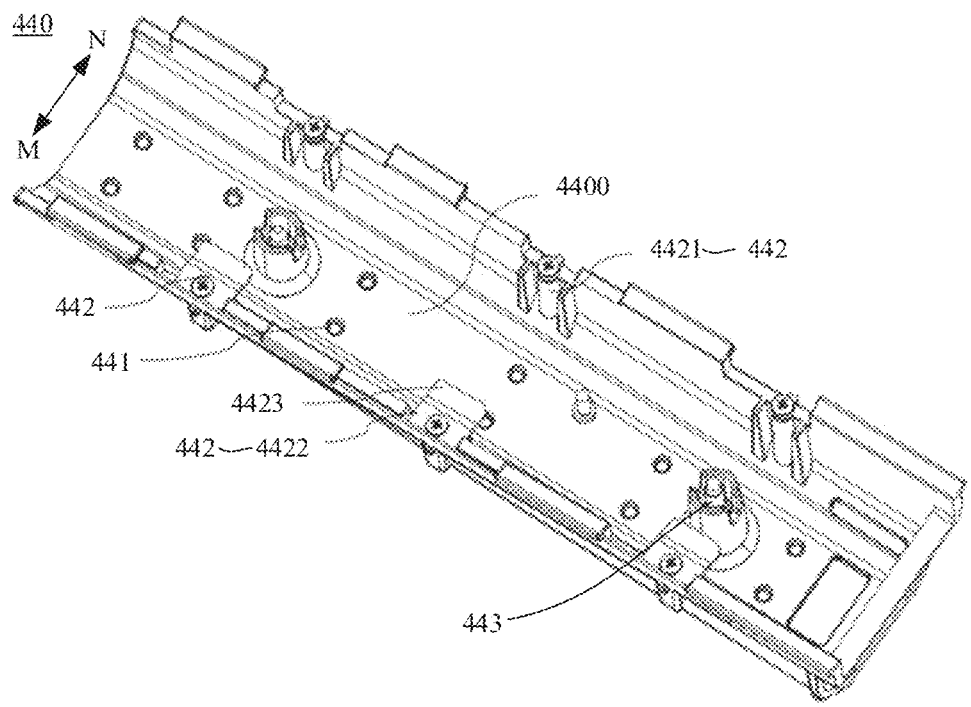
FIG. 27 is a diagram showing a structure of a fixing plate, in accordance with some embodiments.

In some embodiments, as shown in FIGS. 19 and 27, the fixing plate 440 may be connected with the ice tray 430 by means of a fastener. For example, the ice tray 430 further includes a first locking member 432 located on the bottom portion of the first body 4300. The fixing plate 440 includes a second body 4400 and a second locking member 443, and the second locking member 443 is located on an inner surface (e.g., a bottom wall) of the second body 4400. The second locking member 443 matches with the first locking member 432.

For example, the first locking member 432 includes a column with internal threads, and the second locking member 443 includes a screw, and the column is matched with the screw, so that the ice tray 430 may be detachably connected to the fixing plate 440. It is possible to further improve the connection reliability between the fixing plate 440 and the ice tray 430 through the cooperation of the first locking member 432 and the second locking member 443.

Figure 28:
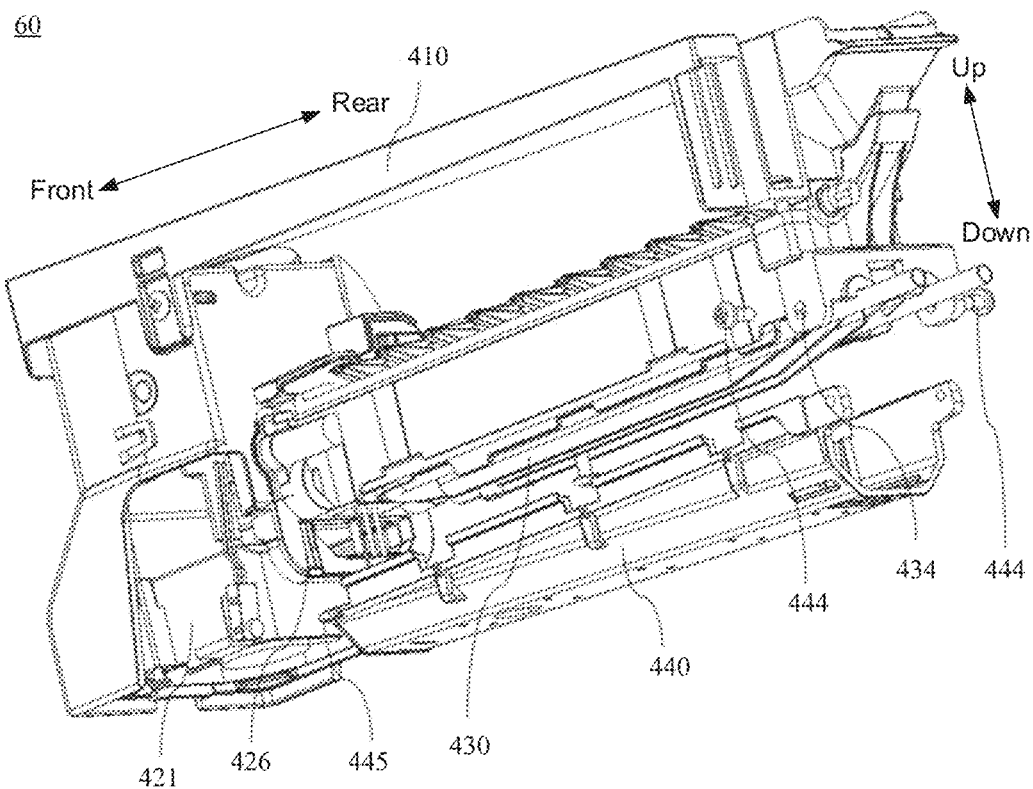
FIG. 28 is an exploded view of a local structure of another ice maker, in accordance with some embodiments.
Figure 29:
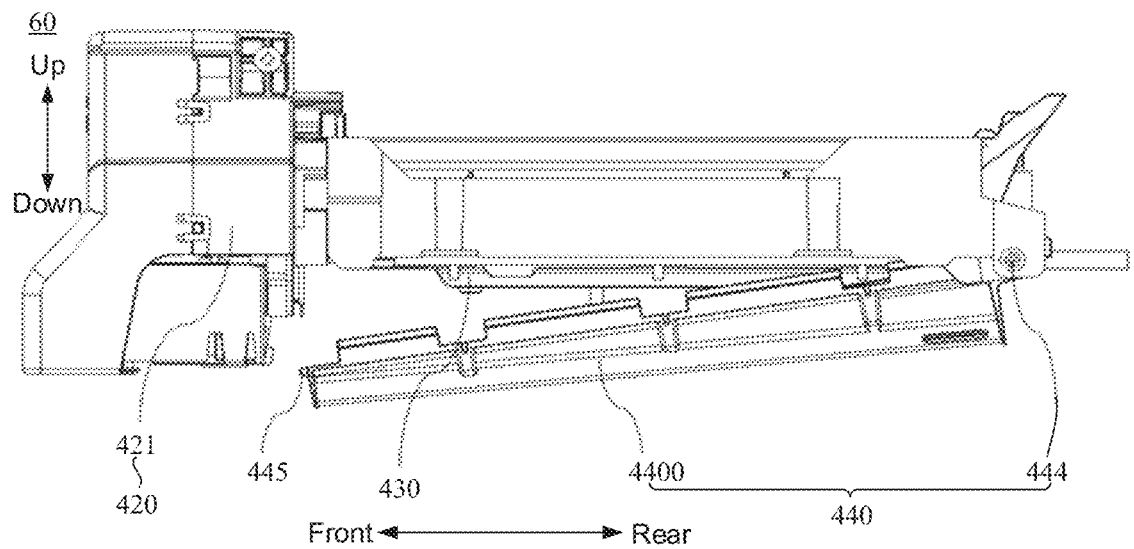
FIG. 29 is a diagram showing a structure of a fixing plate preassembled in an ice maker, in accordance with some embodiments.

In some embodiments, as shown in FIGS. 28 and 29, an end (e.g., a rear end) of the fixing plate 440 away from the fan assembly 420 is rotatably connected to the ice tray 430. For example, the ice tray 430 further includes a first shaft member 434 disposed on an end (e.g., a rear end) of the first body 4300 away from the fan assembly 420. The fixing plate 440 further includes a second shaft member 444 located on an end (e.g., a rear end) of the second body 4400 away from the fan assembly 420. The second shaft member 444 is matched with the first shaft member 434.

For example, the first shaft member 434 includes a shaft hole, and the second shaft member 444 includes a shaft matched with the shaft hole, so that the fixing plate 440 may rotate downwards around the shaft relative to the ice tray 430 (as shown in FIG. 29).

In addition, as shown in FIG. 28, the ice maker 60 further includes a first camping portion 426 disposed on the side (e.g., the rear side) of the outer casing 421 proximate to the ice tray 430. The fixing plate 440 further includes a second clamping portion 445 disposed on a side (e.g., a front side) of the second body 4400 proximate to the outer casing 421. The second clamping portion 445 is matched with the first clamping portion 426.

For example, the first clamping portion 426 includes a slot, and the second clamping portion 445 includes a hook. In a case where the fixing plate 440 is installed under the bottom portion of the ice tray 430, the hook may be clamped with the slot after the fixing plate 440 rotates in place, so as to fix the fixing plate 440 to the bottom portion of the ice tray 430.

In a case where the fixing plate 440 is installed to the bottom of the ice tray 430, the end of the fixing plate 440 away from the fan assembly 420 is rotatably connected with the ice tray 430, so as to form a preassembled structure. In this way, it is possible to effectively simplify the installation operation, reduce the installation difficulty, improve the installation efficiency, and make the structure conducive to the disassembly.

In some embodiments, as shown in FIG. 27, the fixing plate 440 further includes a support assembly 442 disposed on the inner wall of the second body 4400, and the support assembly 442 abuts against the first extending segment 311, so that the first extending segment 311 is in close contact with the bottom portion of the ice tray 430. The support assembly 442 includes a supporting portion 4421 and an elastic portion 4422. A portion (e.g., a bottom portion) of the supporting portion 4421 away from the ice tray 430 is connected to the bottom wall of the second body 4400, and a portion (e.g., a top portion) of the supporting portion 4421 proximate to the ice tray 430 is connected to the elastic portion 4422. The elastic portion 4422 is in contact with the first extending segment 311.

For example, a side (e.g., the M side in FIG. 27) of the elastic portion 4422 is connected to the supporting portion 4421 by means of a screw, and another side of the elastic portion 4422 is provided with a supporting sub-portion 4423. A section of the supporting sub-portion 4423 on a plane perpendicular to the MN direction is in a shape of a semicircle, and the supporting sub-portion 4423 is configured to support the first extending segment 311.

In some embodiments, the fixing plate 440 or the supporting portion 4421 may be made of a metal material with a high thermal conductivity. For example, the fixing plate 440 or the supporting portion 4421 is made of aluminum or aluminum alloy. The elastic portion 4422 includes a rubber piece. In this way, in a case where the support assembly 442 abuts against the first extending segment 311, the rubber piece may protect the first extending segment 311. In a case where the second locking member 443 is locked with the first locking member 432, the support assembly 442 may press the first extending segment 311 tightly against the bottom portion of the ice tray 430, so that the first extending segment 311 may be in close contact with the ice tray 430.

In some embodiments of the present disclosure, by providing the fixing plate 440 under the bottom portion of the ice tray 430, the refrigerant pipe 400 may be in close contact with the bottom portion of the ice tray 430. In this way, the refrigerant pipe 400 may be in effective contact with the ice tray 430, so as to increase a heat transfer area between the refrigerant pipe 400 and the ice tray 430, so that the cold generated by the refrigerant pipe 400 may be transferred to the ice tray 430 with maximum efficiency. Moreover, the ventilation duct is provided between the fixing plate 440 and the ice tray 430, and the fan assembly 420 may directly suck in the cool air in the ventilation duct.

As shown in FIGS. 19 and 27, the fixing plate 440 further includes one or more return air portions 441 disposed on the bottom wall of the second body 4400, and the return air portions 441 run through the second body 4400 in a thickness direction of the second body 4400. The return air portion 441 may be a through hole.

In some embodiments, as shown in FIG. 16, the water pan 450 is connected to the outer casing 421 and located on a side (e.g., a lower side) of the fixing plate 440 away from the ice tray 430. There is a return air duct between the water pan 450 and the fixing plate 440. The airflow in the return air duct may enter the ventilation duct through the return air portion 441 and then be sucked in by the fan assembly 420.

The water pan 450 is configured to accommodate overflowing water from the ice tray 430 or condensed water, so as to prevent water from dripping into the ice storage box 70, causing the ice cubes to freeze and stick to each other.

In some embodiments, the water pan 450 includes a heating member configured to heat the water pan 450, so as to accelerate the evaporation rate of water in the water pan 450. For example, the heating member may include a heating plate, or a heating tube.

In some embodiments, as shown in FIG. 3, a drainage component 134 is provided on the rear wall 1310 of the fourth sub-chamber 403, and the drainage component 134 is located on a side (e.g., the lower side) of the limiting portion 131 (or the first extending segment 311) proximate to the ice storage box 70. The water pan 450 communicates with the drainage component 134. For example, the water pan 450 is inclined downward toward the drainage component 134. In this way, the water in the water pan 450 may be quickly discharged, so as to avoid damage to circuit elements in the ice maker 60.

In some embodiments, as shown in FIG. 18, the ice maker 60 further includes a first connecting assembly 4501 and a second connecting assembly 4502. An end (e.g., a front end) of the water pan 450 proximate to the fan assembly 420 is detachably connected to the outer casing 421 through the first connecting assembly 4501, and another end (e.g., a rear end) of the water pan 450 away from the fan assembly 420 is detachably connected to the rear end of the ice tray 430 through the second connecting assembly 4502.

For example, the first connecting assembly 4501 includes a third clamping portion 451 and a fourth clamping portion 425 matching with the third clamping portion 451. The third clamping portion 451 is disposed on the front end of the water pan 450, and the fourth clamping portion 425 is disposed on the rear side of the outer casing 421. The second connecting assembly 4502 includes a hook 452 and a rotating shaft 433 matching the hook 452. The hook 452 is disposed on the rear end of the water pan 450, and the rotating shaft 433 is disposed on the rear end of the ice tray 430.

Figure 30:
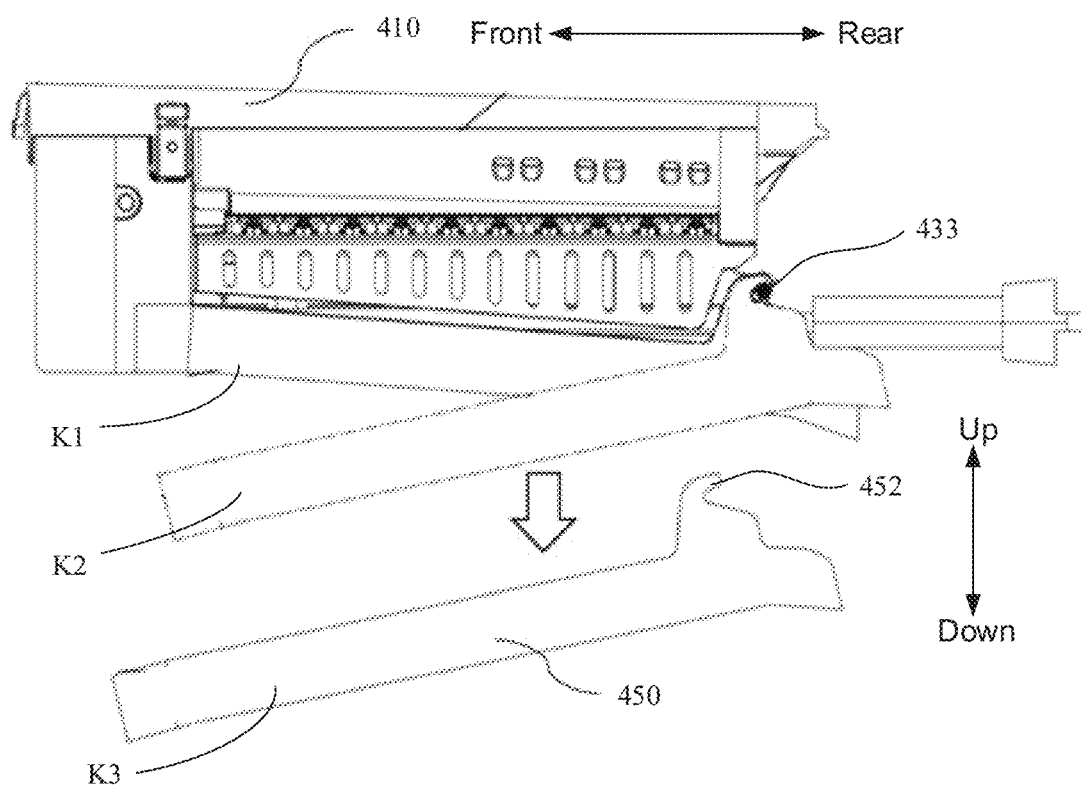
FIG. 30 is a schematic diagram showing an assembly and disassembly process of a water pan, in accordance with some embodiments.

As shown in FIGS. 18 and 30, a disassembly process of the water pan 450 includes that, in a case where the third clamping portion 451 is connected with the fourth clamping portion 425 and the water pan 450 is located at a first preset angle, the hook 452 is hooked on the rotating shaft 433 (as shown at the position K1 in FIG. 30); in a case where the connection between the third clamping portion 451 and the fourth clamping portion 425 has been released, the water pan 450 may rotate downward around the rotating shaft 433 by a second preset angle until the hook 452 is disengaged from the rotating shaft 433 (as shown at the positions K2 and K3 in FIG. 30), so as to disassemble the whole water pan 450. After the water pan 450 is disassembled, it is conducive to the installation of the first extending segment 311. The installation process of the water pan 450 is opposite to the disassembly process, and details will not be repeated herein.

In some embodiments, as shown in FIG. 3, the drainage component 134 includes a first sub-portion 1340 located on a side (e.g., a lower side) of the first extending segment 311 proximate to the ice storage box 70 and an end (e.g., the rear end) of the first sub-portion 1340 away from the ice maker 60 is inclined downward. A top portion of the first sub-portion 1340 has an opening, and a size of the first sub-portion 1340 decreases in a flow direction of the water in the drainage component 134. A flow direction of the water in the drainage component 134 is shown by the dashed line in FIG. 3. The first sub-portion 1340 is used to receive and guide the water from the ice maker 60. The drainage component 134 further includes a second sub-portion 1341. The second sub-portion 1341 is located on a rear end of the first sub-portion 1340, and the second sub-portion 1341 runs through the rear wall 1310 of the fourth sub-chamber 403. The second sub-portion 1341 is used to drain the water guided by the first sub-portion 1340.

In some embodiments, as shown in FIGS. 3 and 18, the water pan 450 includes a third body 4500 and an extending portion 453 disposed on a rear end of the third body 4500, and the water pan 450 may be connected to the drainage component 134 through the extending portion 453. For example, the extending portion 453 is located below the first extending segment 311, and the extending portion 453 corresponds to the opening of the first sub-portion 1340. The extending portion 453 is configured to receive the condensed water dripping from the first extending segment 311, so as to guide the condensed water to the first sub-portion 1340. In this way, the condensed water may be prevented from dripping onto an inner bottom surface of the fourth sub-chamber 403, so as to reduce the possibility of frosting on the inner surface of the fourth sub-chamber 403. In addition, the drainage component 134 collects and guides the water discharged from the water pan 450, so as to discharge the water in time, thereby avoiding damage to the ice maker 60.

In some embodiments, as shown in FIGS. 18, 22 and 23, the ice maker 60 further includes an ice turning rod 460 and a driving assembly 424. The ice turning rod 460 is located on a side (e.g., an upper side) of the ice tray 430 proximate to the base 410, and the driving assembly 424 is located in the outer casing 421. As shown in FIG. 23, an end (e.g., a front end) of the ice turning rod 460 penetrates the outer casing 421 to be connected with the driving assembly 424. The driving assembly 424 is configured to drive the ice turning rod 460 to rotate in a predetermined direction, so as to demold the ice cubes from the ice tray 430.

For example, as shown in FIG. 22, the ice turning rod 460 includes a driving shaft 461 and a cross rod 462 disposed on the outer side of the driving shaft 461. The cross rod 462 includes a plurality of ice turning portions 4621, and the ice tray 430 further includes a plurality of accommodating portions 435, and the plurality of accommodating portions 435 are configured to accommodate water for ice making. For example, the accommodating portion 435 includes a groove. The plurality of ice turning portions 4621 are arranged correspondingly to the plurality of accommodating portions 435, respectively. In a case where the driving assembly 424 drives the ice turning rod 460 to rotate, the ice turning portion 4621 may turn out the ice cube in the corresponding accommodating portion 435, so that the ice cubes may be demolded from the ice tray 430 and fall into the ice storage box 70. The ice tray 430 in FIG. 22 includes ten accommodating portions 435, and the cross rod 462 includes ten ice turning portions 4621. However, the present disclosure is not limited thereto.

In some embodiments, as shown in FIGS. 18 and 22, the cover plate 470 is disposed on the top portion of the ice tray 430. The cover plate 470 includes an avoidance portion 472 and a side plate 473. The avoidance portion 472 is located on the top portion of the ice tray 430, so as to avoid collision between the ice turning portion 4621 and the cover plate 470. For example, the avoidance portion 472 is an opening. A top portion of the cover plate 470 extends downward to form the side plate 473, and the side plate 473 is located on a side of the ice tray 430.

In some embodiments, as shown in FIG. 18, a plurality of air flowing portions 471 are provided on the side plate 473. For example, the air flowing portion 471 is a through hole. The plurality of air flowing portions 471 are used to allow the circulating airflow in the fourth sub-chamber 403 to pass through, and sizes of the plurality of air flowing portions 471 may be same or different with each other. Of course, in some embodiments, as shown in FIG. 22, the side plate 473 may also not include the plurality of air flowing portions 471.

Figure 26:
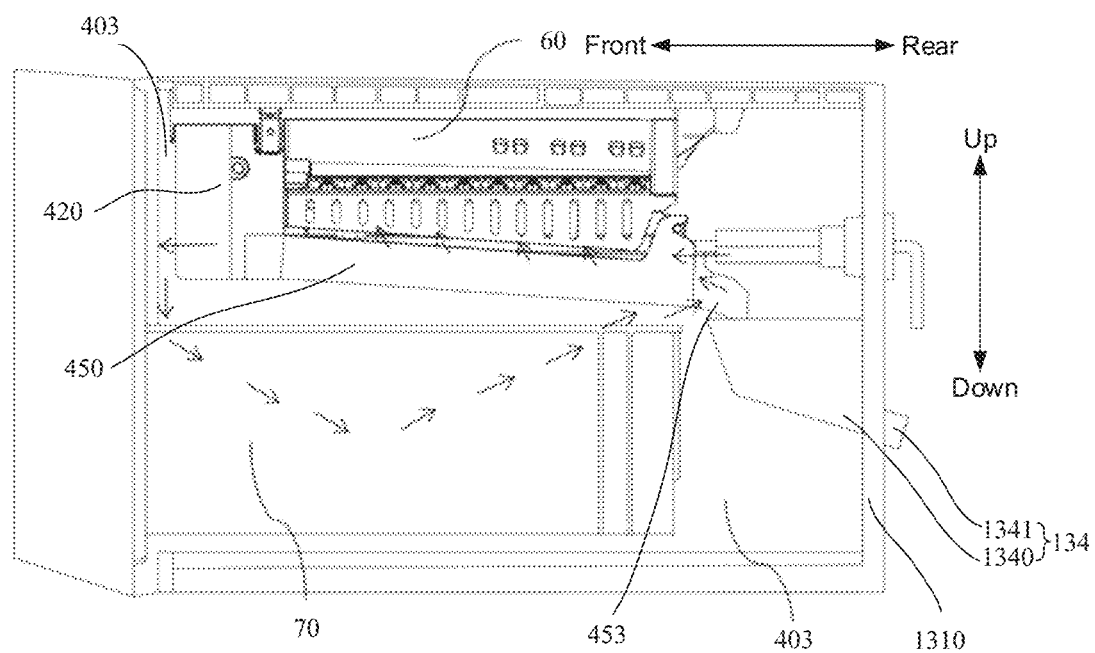
FIG. 26 is a schematic diagram of an air cycle in a fourth sub-chamber, in accordance with some embodiments.

In some embodiments, as shown in FIGS. 18 and 26, in a case where the fan assembly 420 operates, the second fan 422 draws air from the air suction side (for example, cold air is drew from the ventilation duct between the fixing plate 440 and the ice tray 430) and blows the air to the air outlet side.

The air outlet side is defined as the front side. That is to say, the second fan 422 blows air forward. The air moves forward and downward, and after flowing through a corner of the fourth sub-chamber 403 on the front side and the ice storage box 70, the air flows through a corner of the fourth sub-chamber 403 on the rear side. Then, the air passes through the return air duct between the water pan 450 and the fixing plate 440, and passes through the return air portion 441 on the bottom portion of the fixing plate 440, and is sucked in by the second fan 422 again, so as to achieve the air cycle of the fourth sub-chamber 403. A path of the air cycle is substantially shown by the arrows in FIG. 26.

The air in the fourth sub-chamber 403 exchanges heat in the above cycle, which facilitates the temperature balance in the fourth sub-chamber 403 and avoids problems such as frosting, ice sticking, or ice melting due to temperature differences. For example, in the entire fourth sub-chamber 403, a temperature of a region where the ice maker 60 is located is substantially the same as a temperature of a region where the ice storage box 70 is located.

The above description is mainly given by considering an example in which the ice maker 60 includes a single refrigerant pipe 400. Of course, in some embodiments, the ice maker 60 may also include a plurality of refrigerant pipes 400.

Figure 31:
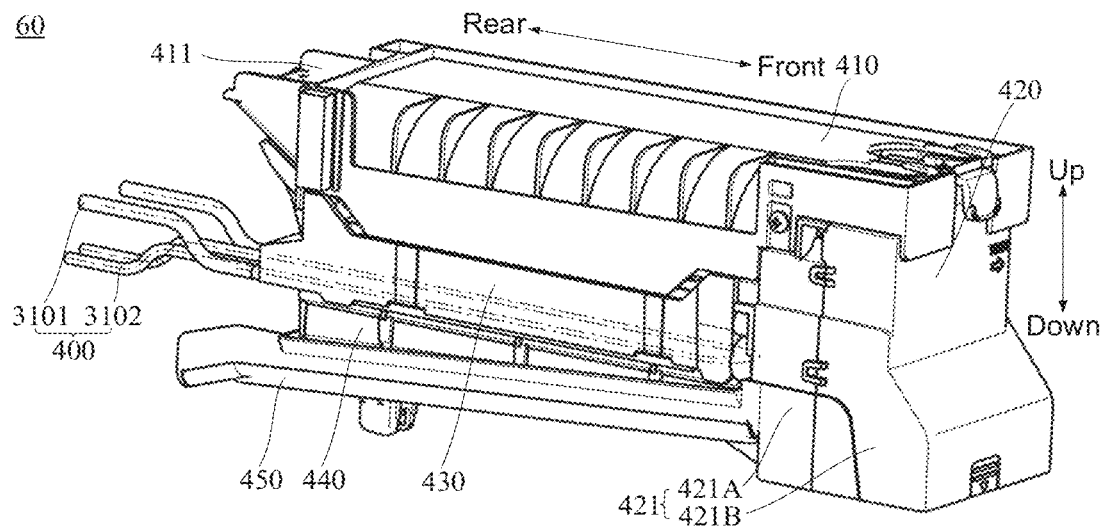
FIG. 31 is a diagram showing a structure of yet another ice maker, in accordance with some embodiments.
Figure 32:
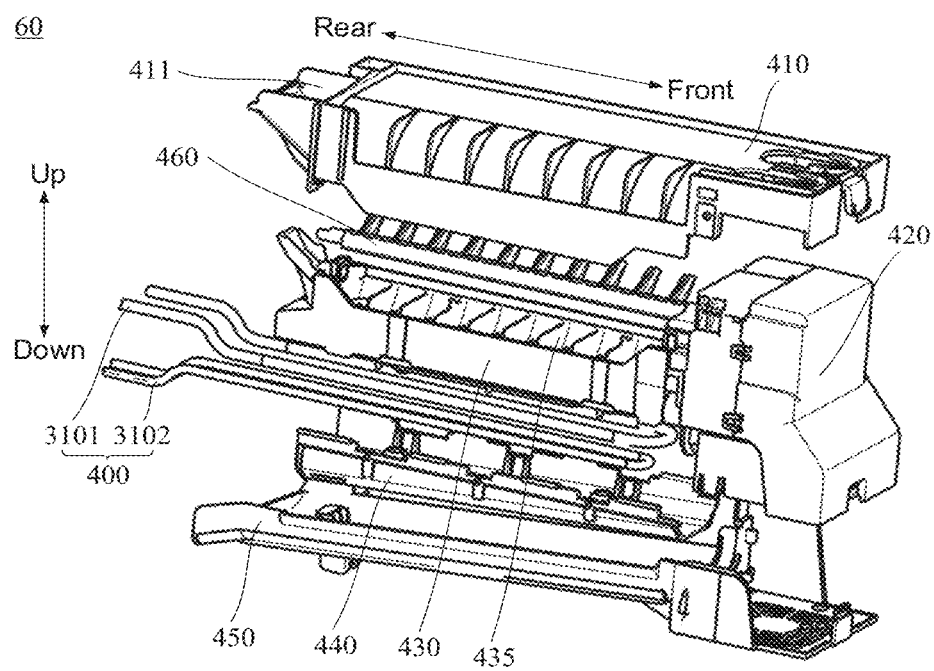
FIG. 32 is an exploded view of yet another ice maker, in accordance with some embodiments.
Figure 33:
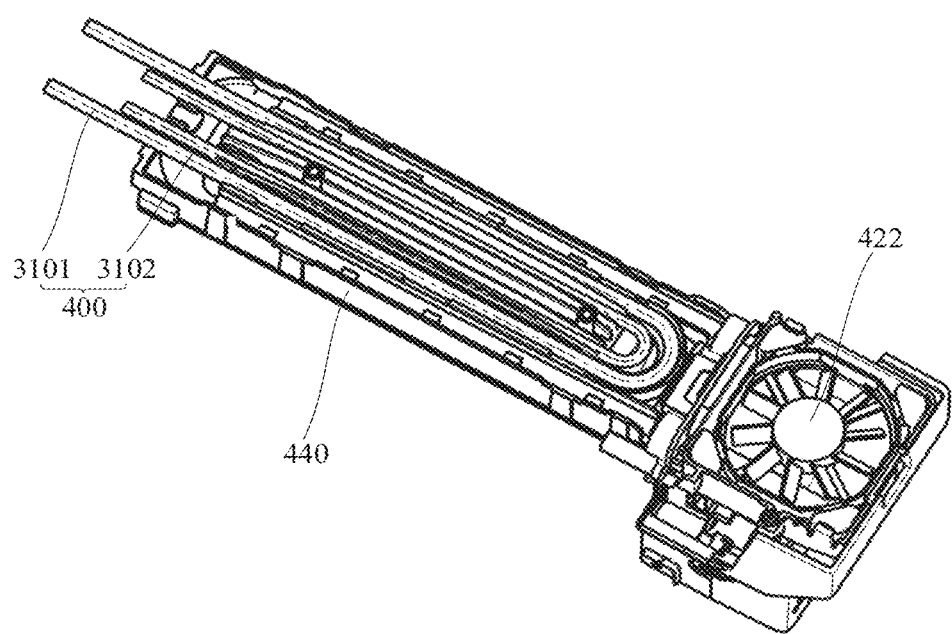
FIG. 33 is a diagram showing a structure of a local structure of yet another ice maker, in accordance with some embodiments.

For example, as shown in FIGS. 31 to 33, the plurality of refrigerant pipes 400 include a first refrigerant pipe 3101 and a second refrigerant pipe 3102. The first refrigerant pipe 3101 and the second refrigerant pipe 3102 each are located under the bottom portion of the ice tray 430, so as to cool the water in the accommodating portions 435 in the ice tray 430 to form ice cubes.

In some embodiments, as shown in FIGS. 32 and 33, a portion of the first refrigerant pipe 3101 and a portion of the second refrigerant pipe 3102 that are located within a range of the ice tray 430 each are in a shape of a capital letter U. An orthogonal projection of the portion of the first refrigerant pipe 3101 located within the range of the ice tray 430 on the reference plane is located outside an orthogonal projection of the portion of the second refrigerant pipe 3102 located within the range of the ice tray 430 on the reference plane. Moreover, in the height direction of the ice maker 60, the portions of the first refrigerant pipe 3101 and the second refrigerant pipe 3102 located within the range of the ice tray 430 are at a same height, and a portion of the first refrigerant pipe 3101 and a portion of the second refrigerant pipe 3102 located outside the range of the ice tray 430 are located at different heights. For example, the portion of the first refrigerant pipe 3101 located outside the range of the ice tray 430 is above the portion of the second refrigerant pipe 3102 located outside the range of the ice tray 430.

The first refrigerant pipe 3101 and the second refrigerant pipe 3102 each perform cooling, and there is a temperature difference between the refrigerant in the first refrigerant pipe 3101 and the refrigerant in the second refrigerant pipe 3102. Therefore, if the portions of the first refrigerant pipe 3101 and the second refrigerant pipe 3102 located outside the range of the ice tray 430 are at a same height, the refrigerants in the portions of the first refrigerant pipe 3101 and the second refrigerant pipe 3102 located outside the range of the ice tray 430 transfer cold to each other, thereby affecting the cooling effect of the ice tray 430 by the refrigerants. Therefore, by arranging the portions of the first refrigerant pipe 3101 and the second refrigerant pipe 3102 located outside the range of the ice tray 430 at different heights, it is possible to reduce loss of the cold of the refrigerants in different refrigerant pipes 400 before the refrigerants cool the ice tray 430, so as to improve the ice making effect of the ice maker 60.

Moreover, by providing the first refrigerant pipe 3101 and the second refrigerant pipe 3102 in the shape of the capital letter U, any one refrigerant pipe 400 may substantially cover the entire region of the ice tray 430. In this way, in a case where at least one of the first refrigerant pipe 3101 or the second refrigerant pipe 3102 cools, the refrigerant pipe 400 may uniformly cool the entire region of the ice tray 430, so as to improve the ice making effect of the ice maker 60.

It will be noted that, in a case where the refrigerant pipes 400 include the first refrigerant pipe 3101 and the second refrigerant pipe 3102, a corresponding support assembly 442 is provided on the inner wall of the fixing plate 440, so as to fix the first refrigerant pipe 3101 and the second refrigerant pipe 3102, so that the first refrigerant pipe 3101 and the second refrigerant pipe 3102 may be in direct contact with the ice tray 430 of the ice maker 60, and the displacement of the two refrigerant pipes 400 may be avoided.

In the ice maker 60 provided in some embodiments of the present disclosure, the ice maker 60 includes the plurality of refrigerant pipes 400, and the plurality of refrigerant pipes 400 may be used in cooperation with the plurality of cooling flow paths, so as to meet various cooling demands. Moreover, the plurality of refrigerant pipes 400 each may cool the ice maker 60, thereby improving the operating efficiency of the ice maker 60. In addition, since the plurality of refrigerant pipes 400 are provided, even if one of the refrigerant pipes 400 is damaged, the ice maker 60 may still operate normally through other refrigerant pipes 400, which improves the stability of the ice maker 60.

During the water injection process, a lot of bubbles may be generated when water falls into the ice tray, and some of the bubbles may be dissolved in the water. When ice making begins, the water freezes from the outside to the inside. Therefore, after a layer of ice shell forms on the surface of the water, the inside of the water is equivalent to a closed space, and the bubbles in the water cannot overflow to the outside, and the bubbles are frozen inside the water. As a result, there are a lot of bubbles inside the ice cube, and the firmness of the ice cube is poor.

In order to solve the above problem, in some embodiments, the controller 90 is configured to: control the water injecting device 1000 to inject water into the ice tray 430 after obtaining an ice making start instruction; control the water injecting device 1000 to stop injecting water and save current water injecting time after the current water injecting time is equal to a first preset time T1; control the ice maker 60 to start ice making after water injection is stopped; control the ice maker 60 to stop ice making after the water currently injected into the ice tray 430 has frozen; determine that the ice tray 430 has been filled with water and the ice maker 60 has completed ice making if a sum of the saved water injecting time is equal to a total water injecting time T; and control the water injecting device 1000 to inject water again and control the ice maker 60 to make ice if the sum of the saved water injecting time is less than the total water injecting time T.

In some embodiments, the controller 90 is further configured to control the ice maker 60 to perform ice scraping if the ice storage box 70 is not full of ice cubes in a case where the sum of the saved water injecting time is equal to the total water injecting time T.

In some embodiments, the controller 90 is further configured to determine that the water currently injected into the ice tray 430 has frozen in a case where a duration of ice making by the ice maker 60 reaches a second preset time T2.

In some embodiments, after each water injection is completed, and before the ice maker 60 makes ice, the controller 90 is further configured to control the ice maker 60 to start making ice after the water injection is stopped and waiting time of the ice maker 60 reaches a third preset time T3.

In some embodiments, the controller 90 is further configured to: control the water injecting device 1000 to continue injecting water in a case of obtaining an ice making stop instruction during the water injection process; control the water injecting device 1000 to stop injecting water and save the current water injecting time after the current water injecting time is equal to the first preset time T1; and control the ice maker 60 to stop ice making; control the ice maker 60 to start ice making if obtaining the ice making start instruction. Here, after the ice maker 60 starts ice making, the controller 90 performs the same steps as above, and details will not be repeated herein.

In some embodiments, the controller 90 is further configured to: control the ice maker 60 to continue making ice in a case of obtaining the ice making stop instruction during the ice making process; control the ice maker 60 to stop ice making after the water currently injected into the ice tray 430 has frozen; determine that the ice tray 430 has been filled with water and the ice maker 60 has completed ice making if obtaining the ice making start instruction, and the sum of the saved water injecting time is equal to the total water injecting time T; and control the water injecting device 1000 to inject water again and control the ice maker 60 to make ice if obtaining the ice making start instruction, and the sum of the saved water injecting time is less than the total water injecting time T.

Some embodiments of the present disclosure further provide a control method of a refrigerator. The method is applied to the controller 90. The refrigerator includes the ice maker 60, the refrigeration cycle system 20, the water injecting device 1000, and the controller 90 described above. The ice maker 60 includes the ice tray 430. The refrigeration cycle system 20 includes the ice making flow path 300. The controller 90 is further configured to control the ice making flow path 300 to supply cold to the ice tray 430 in the ice maker 60, so that the ice maker 60 may make ice. Of course, in some embodiments, the ice maker 60 may also cool the ice tray 430 by means of air cooling.

Figure 34:
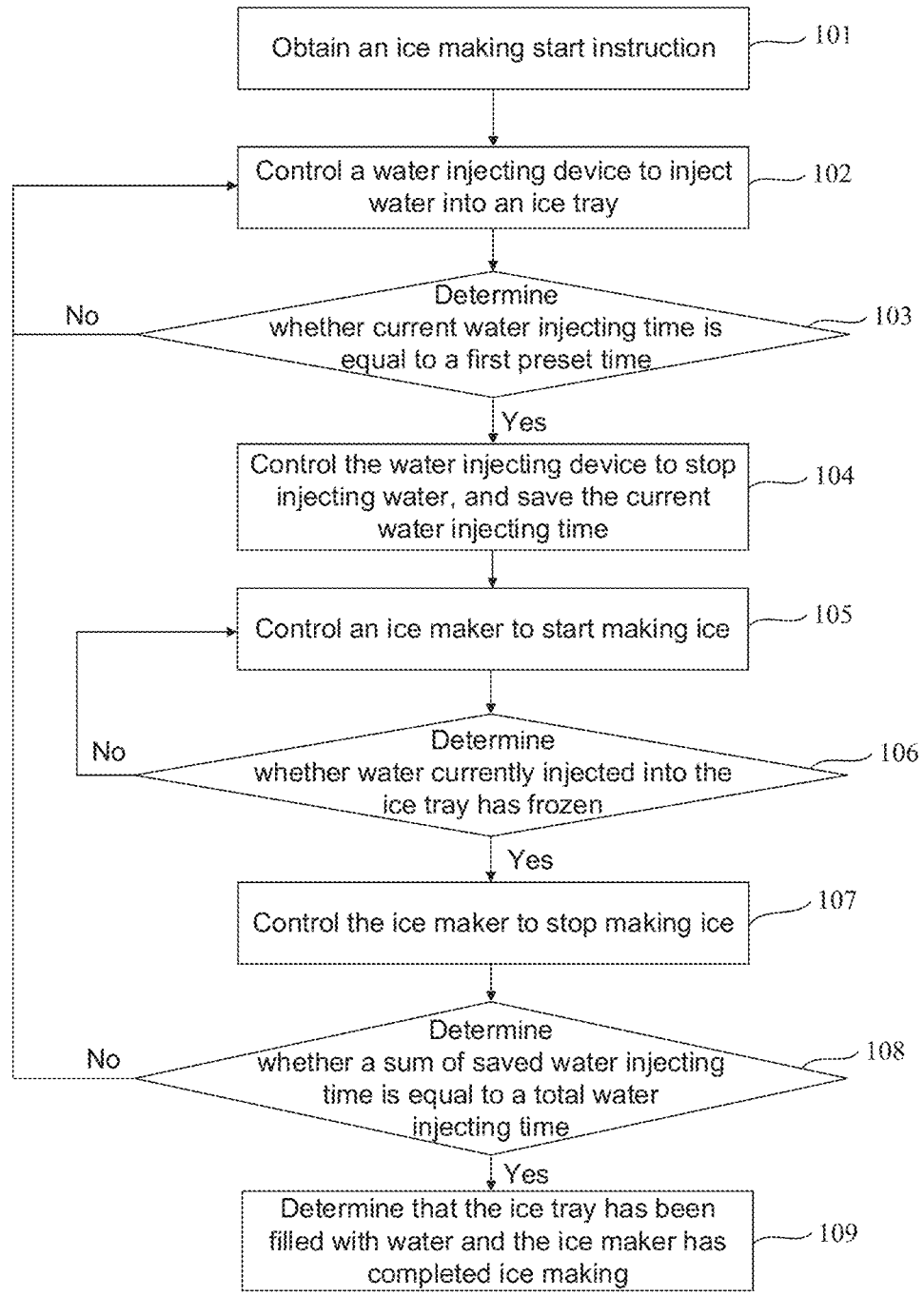
FIG. 34 is a flow chart of a control method of a refrigerator, in accordance with some embodiments.

As shown in FIG. 34, the control method of the refrigerator includes step 101 to step 109.

In step 101, an ice making start instruction is obtained.

The user may input the ice making start instruction through an operating panel of the refrigerator 1 or input the ice making start instruction through a terminal device (e.g., a mobile phone) communicatively connected with the controller 90, in response to the ice making start instruction, the controller 90 controls the refrigerator to perform ice making.

In step 102, the water injecting device 1000 is controlled to inject water into the ice tray 430.

In step 103, whether current water injecting time is equal to a first preset time T1 is determined. If so, step 104 is performed; if not, step 102 is performed.

It will be noted that the first preset time T1 is a preset time for each water injection. The first preset time T1 satisfies the following formula (1).

$$T = N \times T1 \qquad (1)$$

Here, N is a preset number of times of water injection and is a natural number greater than or equal to 2. T is the total water injecting time required for the ice tray 430 to be filled with water. The total water injecting time T is a preset time threshold according to an actual capacity of the ice tray 430 in the ice maker 60.

In step 104, the water injecting device 1000 is controlled to stop injecting water, and the current water injecting time is saved.

In step 105, the ice maker 60 is controlled to start making ice.

In step 106, whether the water currently injected into the ice tray 430 has frozen is determined. If so, step 107 is performed; if not, step 105 is performed to control the ice maker 60 to continue making ice.

In step 107, the ice maker 60 is controlled to stop making ice.

The controller 90 may determine whether the water currently injected into the ice tray 430 has frozen according to an ice making duration of the ice maker 60.

For example, the controller 90 saves the duration of ice making through a timer after controlling the ice maker 60 to start ice making. In a case where the duration of ice making reaches a second preset time T2, the controller 90 determines that the water currently injected into the ice tray 430 has frozen. The second preset time T2 is a preset threshold. For example, the second preset time T2 is any value within a range of 30 min to 90 min.

However, the present disclosure is not limited thereto. In some embodiments, the controller 90 may also determine whether the water currently injected into the ice tray 430 has frozen by detecting a temperature of the water in the ice tray 430.

For example, the ice maker 60 includes a temperature sensor coupled to the controller 90. The temperature sensor is configured to detect the temperature of the water in the ice tray 430. The controller 90 may determine whether the water currently injected into the ice tray 430 has frozen according to the temperature of the water in the ice tray 430 detected by the temperature sensor.

After the controller 90 controls the ice maker 60 to start ice making, the temperature sensor detects the temperature of the water injected into the ice tray 430 in real time. In a case where the temperature is lower than $-2°$ C., and the duration of the temperature lower than $-2°$ C. reaches a fourth preset time T4, the controller 90 determines that the water currently injected into the ice tray 430 has frozen. Alternatively, in a case where the temperature is lower than $-4°$ C., the controller 90 determines that the water currently injected into the ice tray 430 has frozen.

The fourth preset time T4 is a preset threshold. For example, the fourth preset time T4 is any value within a range of 10 min to 40 min.

In step 108, whether a sum of the saved water injecting time is equal to the total water injecting time T is determined. If so, step 109 is performed; if not, step 102 is performed. In a case where the sum of the saved water injecting time is less than the total water injecting time T, the ice tray 430 has not been filled with water, and the controller 90 needs to control the water injecting device 1000 to inject water again and control the ice maker 60 to make ice.

In step 109, it is determined that the ice tray 430 has been filled with water and the ice maker 60 has completed ice making.

It will be noted that, after the ice maker 60 completes ice making, the controller 90 deletes the previously saved water injecting time each time, so as to avoid interference with the next ice making.

In some embodiments, after the ice making ends, the controller 90 needs to determine whether the ice storage box 70 is full of ice cubes before controlling the ice maker 60 to perform ice scraping. If the ice storage box 70 is full of ice cubes, the ice maker 60 does not perform ice scraping, so as to avoid overflow of the ice storage box 70 and damage to the ice maker 60. If the ice storage box 70 is not full of ice cubes, the ice maker 60 may perform ice scraping, so that the ice cubes in the ice tray 430 may fall into the ice storage box 70.

For the process of how the ice maker 60 detects whether the ice storage box 70 is full of ice cubes, reference may be made to the relevant description above, and details will not be repeated herein. It will be noted that, in a case where the infrared sensor detects that the ice cubes in the ice storage box 70 has reached the maximum ice storage amount (i.e., in a case where the ice storage box 70 is full of ice cubes), even if the controller 90 receives the ice making start instruction, the controller 90 will not control the ice maker 60 to start.

In the control method of the refrigerator in some embodiments of the present disclosure, by controlling the water injecting device 1000 and the ice maker 60 to operate alternately, water may be injected into the ice tray 430 in a plurality of times to make ice. Since amount of water injected into the ice tray 403 each time is less than the total water injecting amount, compared with a method of filling the ice tray 430 with water at once, there are less bubbles generated during each water injection in the method of injecting water many times. Moreover, the small amount of water is conducive to the rapid leakage of air from the water, so that the ice cubes made each time may have few bubbles. The method of injecting water many times and making ice many times solves the problem of many bubbles inside the ice cube, and reduces the bubbles inside the ice cube, and improves the hardness of the ice cube.

Figure 35:
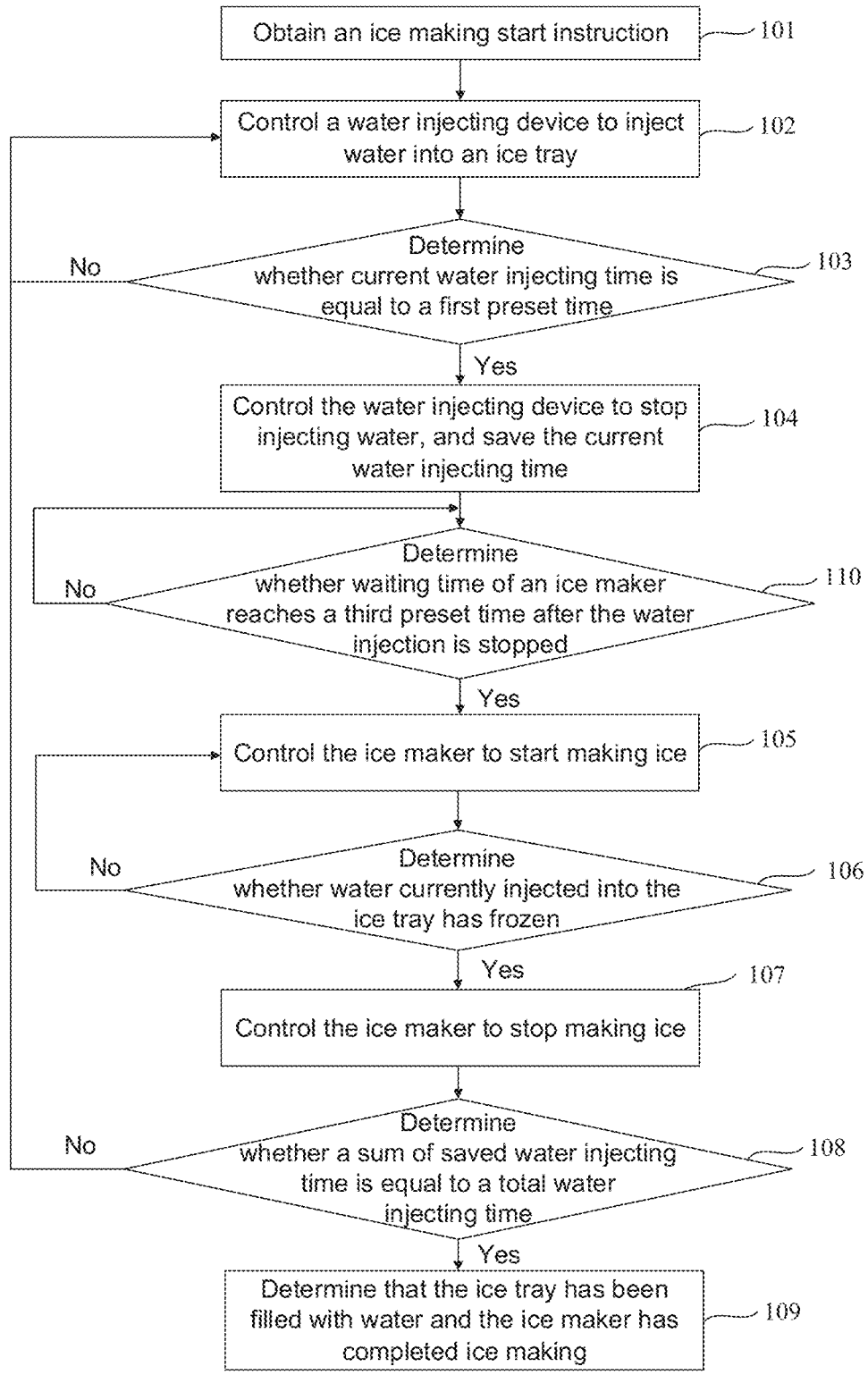
FIG. 35 is a flow chart of another control method of a refrigerator, in accordance with some embodiments.

In some embodiments, as shown in FIG. 35, the method further includes step 110 after each water injection is completed and before the ice maker 60 makes the ice.

In step 110, whether waiting time of the ice maker 60 reaches a third preset time T3 after the water injection is stopped is determined. If so, the ice making step 105 is performed; if not, the controller 90 controls the ice maker 60 to continue waiting.

It will be noted that the third preset time T3 is a preset time threshold. For example, the third preset time T3 is any value within a range of 1 min to 20 min. The third preset time T3 may be preset according to the amount of water injected each time and the expected ice making time of the user.

In this way, by adding the waiting time after each water injection and before each ice making, it is convenient to the leakage of air from the water, thereby reducing bubbles inside the water in the ice tray 430.

Figure 36:
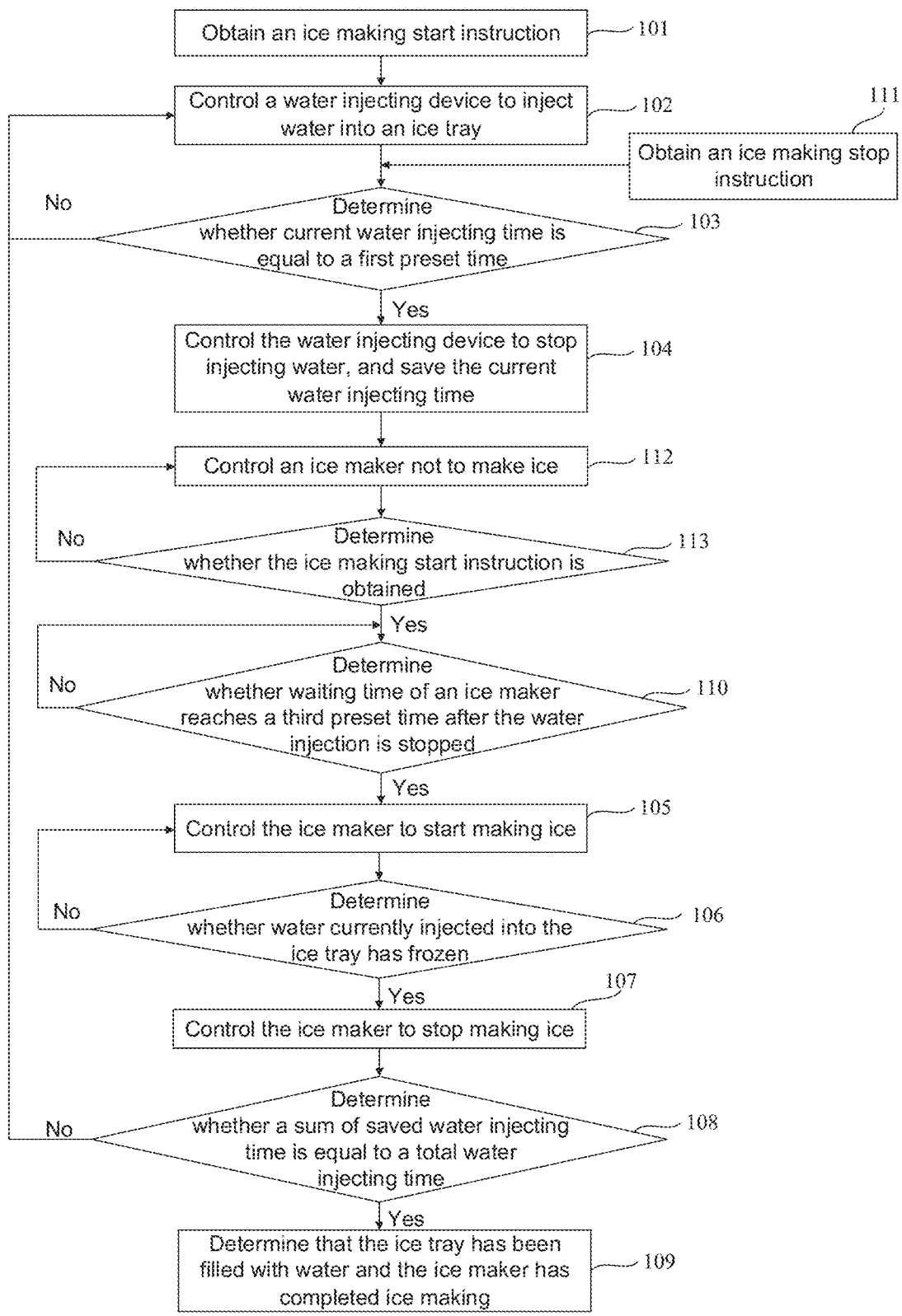
FIG. 36 is a flow chart of yet another control method of a refrigerator, in accordance with some embodiments.

A case where the ice making is stopped halfway before the ice making ends may occur in the actual usage. Therefore, in some embodiments, as shown in FIG. 36, in a case where the controller 90 obtains the ice making stop instruction and is performing water injection step 102 before ending ice making, the method further includes step 111, step 112 and step 113.

In step 111, the ice making stop instruction is obtained.

After step 111, the water injecting device 1000 is controlled to continue injecting water until the current water injecting time is equal to the first preset time T1, and the controller 90 performs step 104 and step 112 in sequence.

In step 112, the ice maker 60 is controlled not to make ice.

The controller 90 controls the water injecting device 1000 to stop injecting water after the current water injection has been completed. Moreover, the current water injecting time is saved, and then the ice maker 60 is controlled not to make ice.

In step 113, whether the ice making start instruction is obtained is determined. If so, step 110 is performed, and the ice making step 105 is performed after the step 110; if not, the ice maker 60 is controlled to still maintain not to make ice.

In a case where the controller 90 obtains the ice making start instruction again, the controller 90 first controls the ice maker 60 to make ice (i.e., the controller 90 performs the step 105), or the controller 90 first performs the step 110, and then performs the ice making step 105 after performing the step 110 (as shown in FIG. 36), so as to refreeze the water that has been injected into the ice tray 430 into ice. Then, the controller 90 determines whether the sum of the saved water injecting time is equal to the total water injecting time T. If the sum of the saved water injecting time is less than the total water injecting time T, it is determined that the ice tray 430 has not been filled with water, and the controller 90 returns to perform step 102. If the sum of the saved water injecting time is equal to the total water injecting time T, it is determined that the ice tray 430 has been filled with water, and the controller 90 controls the ice maker 60 to end the ice making, so that the ice making has been completed.

In a case where the ice making stop instruction is received during the water injection process, the water injection and the ice making may be stopped after the current water injection is completed, which may be conducive to the calculation of the water injecting time in a case where the ice maker 60 continues making ice subsequently, and improving the accuracy of the calculation of the water injecting time.

Figure 37:
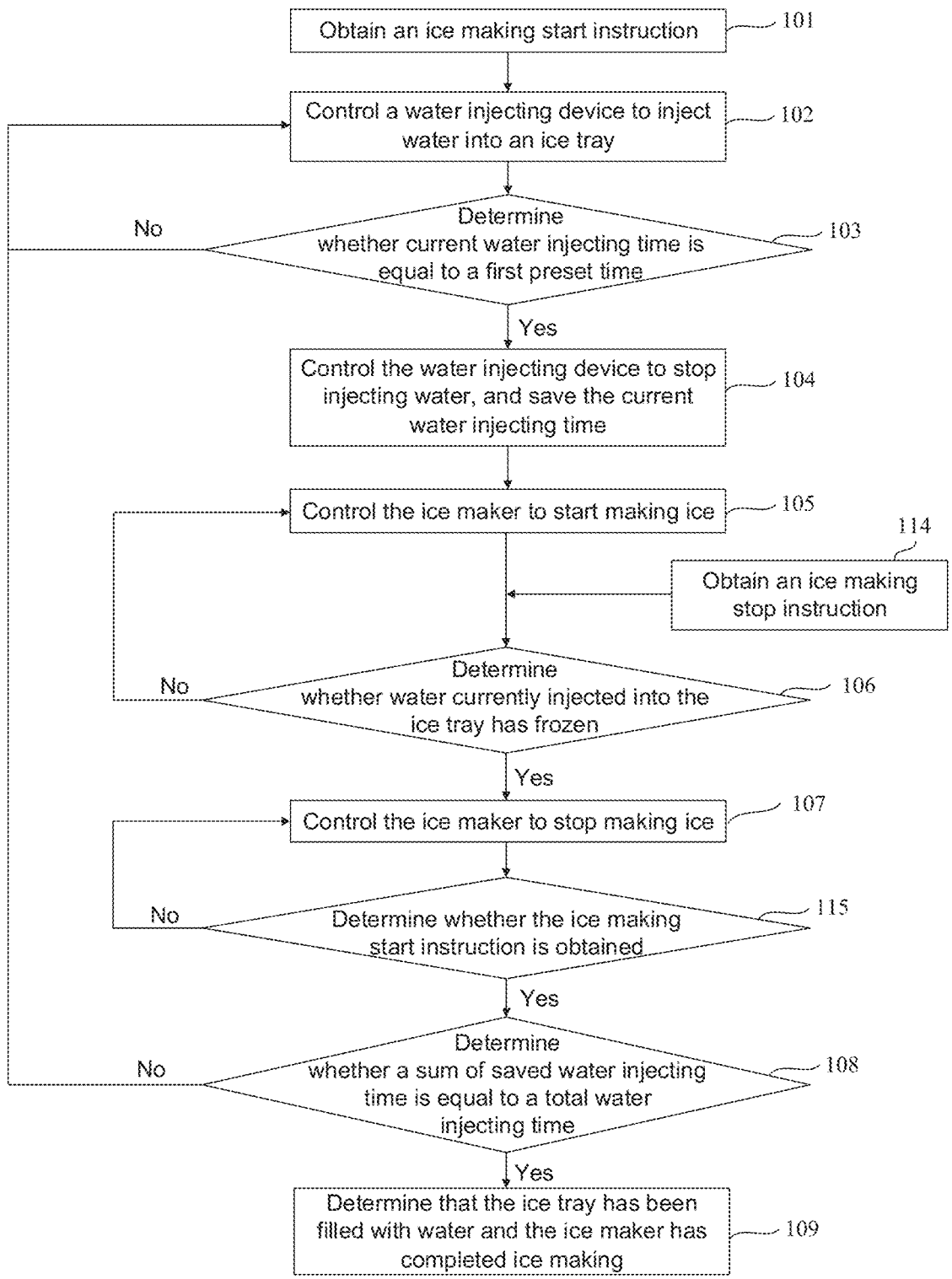
FIG. 37 is a flow chart of yet another control method of a refrigerator, in accordance with some embodiments.

In some embodiments, as shown in FIG. 37, in a case where the controller 90 obtains the ice making stop instruction and is performing the ice making step 105 before ending the ice making, the method further includes step 114 and step 115.

In step 114, the ice making stop instruction is obtained.

After step 114, the controller 90 controls the ice maker 60 to continue making ice. In a case where the controller 90 determines that the water currently injected into the ice tray 430 has frozen, the controller 90 performs step 107. That is to say, the controller 90 controls the ice maker 60 to stop ice making after completing ice making for the current water injection.

In step 115, whether the ice making start instruction is obtained is determined. If so, step 108 is performed; if not, the ice maker 60 is controlled to maintain a state of stopping making ice.

In a case where the controller 90 obtains the ice making start instruction again, the controller 90 first determines whether the sum of the saved water injecting time is equal to the total water injecting time T. If the sum of the saved water injecting time is less than the total water injecting time T, it is determined that the ice tray 430 has not been filled with water, and the controller 90 returns to perform step 102, so as to perform the water injection and ice making operations again. If the sum of the saved water injecting time is equal to the total water injecting time T, it is determined that the ice maker 430 has been filled with water, and the ice maker 60 completes ice making, and the controller 90 controls the ice maker 60 to stop ice making.

In a case where the ice making stop instruction is received during the ice making process, the ice making is stopped after the current ice making is completed, which may be conducive to the calculation of the ice making time in a case where the ice maker 60 continues making ice subsequently and improve the accuracy of the calculation of the ice making time.

For ease of description, the following is mainly given by considering an example in which the number N of times of water injection is equal to 3, and the waiting time after each water injection is stopped includes first time Tt1, second time Tt2, and third time Tt3.

The controller 90 controls the water injecting device 1000 to perform a first water injection for the ice tray 430 after obtaining the ice making start instruction. In a case where first water injecting time t1 is equal to the first preset time T1, the controller 90 controls the water injecting device 1000 to stop injecting water and saves the first water injecting time t1. After controlling the water injecting device 1000 to complete the first water injection, the controller 90 controls the ice maker 60 to wait for the first time Tt1. In a case where the first time Tt1 is equal to the third preset time T3, the controller 90 controls the ice maker 60 to start first ice making.

In a case where the water injected into the ice tray 430 has frozen, the controller 90 controls the ice maker 60 to stop the first ice making. At this time, since the sum of the saved water injecting time is less than the total water injecting time T, the controller 90 returns to perform step 102. That is to say, the controller 90 controls the water injecting device 1000 to perform a second water injection for the ice tray 430.

In a case where second water injecting time t2 reaches the first preset time T1, the controller 90 controls the water injecting device 1000 to stop injecting water and saves the second water injecting time t2. After controlling the water injecting device 1000 to complete the second water injection, the controller 90 controls the ice maker 60 to wait for the second time Tt2. In a case where the second time Tt2 is equal to the third preset time T3, the controller 90 controls the ice maker 60 to start second ice making until the water injected into the ice tray 430 has frozen, and the controller 90 controls the ice maker 60 to stop the second ice making.

At this time, since the sum (e.g., (t1+t2)) of the saved water injecting time is still less than the total water injecting time T, the controller 90 returns to perform step 102 again. That is to say, the controller 90 controls the water injecting device 1000 to perform a third water injection for the ice tray 430.

In a case where third water injecting time t3 reaches the first preset time T1, the controller 90 controls the water injecting device 1000 to stop injecting water and saves the third water injecting time t3. After controlling the water injecting device 1000 to complete the third water injection, the controller 90 controls the ice maker 60 to wait for the third time Tt3. In a case where the third time Tt3 is equal to the third preset time T3, the controller 90 controls the ice maker 60 to start third ice making until the water injected into the ice tray 430 has frozen, and the controller 90 controls the ice maker 60 to stop the third ice making.

At this time, since the sum (i.e., (t1+t2+t3)) of the saved water injecting time is equal to the total water injecting time T, the ice maker 60 completes ice making.

Figure 38:
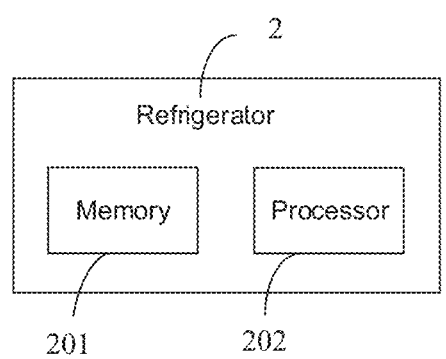
FIG. 38 is a block diagram of a refrigerator, in accordance with some embodiments.

As shown in FIG. 38, some embodiments of the present disclosure further provide a refrigerator 2 including a memory 201 and a processor 202. One or more computer programs including instructions are stored in the memory 201. In a case where the instruction is executed by the processor 202, the refrigerator 2 is made to execute the above control method of the refrigerator.

A person skilled in the art will understand that the scope of disclosure in the present disclosure is not limited to specific embodiments discussed above and may modify and substitute some elements of the embodiments without departing from the spirits of the present disclosure. The scope of the present disclosure is limited by the appended claims.

What is claimed is:

1. A refrigerator comprising:
a refrigerator body including a chamber;
an ice maker located in the chamber, the ice maker being configured to make ice, and including two refrigerant pipes;
a refrigeration cycle system including at least one compressor, at least one condenser, and two cooling flow paths connected to the two refrigerant pipes, respectively, and the two cooling flow paths being configured to cool the ice maker; and
a controller configured to control the compressor to be turned on or off, and to control the two cooling flow paths to open or be closed, so as to cool the ice maker through at least one of the two refrigerant pipes;
wherein the ice maker includes an ice tray; the two refrigerant pipes include a first refrigerant pipe and a second refrigerant pipe, and the first refrigerant pipe and the second refrigerant pipe are located at a bottom portion of the ice tray, a portion of the first refrigerant pipe located within a range of the ice tray is at a same height as a portion of the second refrigerant pipe located within the range of the ice tray; in a height direction of the ice maker, a portion of the first refrigerant pipe located outside the range of the ice tray and a portion of the second refrigerant pipe located outside the range of the ice tray are located at different heights.

2. The refrigerator according to claim 1, wherein the chamber includes a first sub-chamber, the compressor and the condenser constitute a transport flow path including a refrigerant discharge end and a refrigerant return end, outlet ends of the two refrigerant pipes each are connected to the refrigerant return end, and the compressor and the condenser are sequentially arranged along a flow direction of a refrigerant in the transport flow path;
the two cooling flow paths include:
a freezing flow path configured to cool the first sub-chamber and the ice maker, an end of the freezing flow path being connected to the refrigerant discharge end, and another end of the freezing flow path being connected to an inlet end of the first refrigerant pipe; and
an ice making flow path provided with the ice maker, the ice making flow path being configured to cool the ice maker, an end of the ice making flow path being connected to the refrigerant discharge end, and another end of the ice making flow path being connected to an inlet end of the second refrigerant pipe;
the refrigeration cycle system further includes a switching valve group connected to the refrigerant discharge end, and the switching valve group being disposed on upstream sides of the freezing flow path and the ice making flow path, the controller being coupled to the switching valve group and configured to control the switching valve group to switch between a first target position, a second target position, and a third target position;

wherein the transport flow path communicates with the freezing flow path and the ice making flow path in the first target position;

the transport flow path communicates with the freezing flow path and is disconnected from the ice making flow path in the second target position; and the transport flow path communicates with the ice making flow path and is disconnected from the freezing flow path in the third target position.

3. The refrigerator according to claim 2, further comprising an ice storage box, wherein the controller is configured to:

control the switching valve group to the first target position in a case where an amount of required ice cubes is greater than or equal to a first threshold and less than or equal to a maximum ice storage amount of the ice storage box;

control the switching valve group to the third target position in a case where the amount of required ice cubes is greater than or equal to a second threshold and less than the first threshold; and control the switching valve group to the second target position in a case where the amount of required ice cubes is less than the second threshold.

4. The refrigerator according to claim 2, wherein the ice making flow path includes a first throttling device, and the first throttling device and the ice maker are arranged in sequence along a flow direction of a refrigerant in the ice making flow path, an end of the first throttling device is connected to the refrigerant discharge end, and another end of the first throttling device is connected to the inlet end of the second refrigerant pipe of the ice maker, and the switching valve group is disposed on an upstream side of the first throttling device.

5. The refrigerator according to claim 2, wherein the freezing flow path includes:

a second throttling device, an end of the second throttling device being connected to the refrigerant discharge end, and the switching valve group being provided on an upstream side of the second throttling device; and a first evaporator, the second throttling device and the first evaporator being arranged in sequence along a flow direction of a refrigerant in the freezing flow path, the first evaporator having a refrigerant inlet end and a refrigerant outlet end, and the refrigerant inlet end of the first evaporator being connected to another end of the second throttling device, and the refrigerant outlet end of the first evaporator being connected to the inlet end of the first refrigerant pipe.

6. The refrigerator according to claim 5, wherein the controller is further configured to:

control the switching valve group to the third target position in a case where the first evaporator defrosts and the ice maker has an ice making demand; and control the switching valve group to the third target position in a case where a temperature in the first sub-chamber reaches a target preset temperature and the ice maker has the ice making demand.

7. The refrigerator according to claim 5, wherein the chamber further includes a second sub-chamber; the refrigeration cycle system further includes a refrigerating flow path configured to cool the second sub-chamber, an end of the refrigerating flow path is connected to the switching valve group, and another end of the refrigerating flow path is connected to a first node of the freezing flow path, and the first node is located between the second throttling device and the first evaporator;

wherein the refrigerating flow path includes a third throttling device and a second evaporator, and the third throttling device and the second evaporator are arranged in sequence along a flow direction of a refrigerant in the refrigerating flow path.

8. The refrigerator according to claim 7, further comprising a fan located in the first sub-chamber, the controller being coupled to the fan and configured to control the fan to be turned on or off;

wherein the chamber further includes a third sub-chamber, an air duct is provided between the third sub-chamber and the first sub-chamber, and the first evaporator is further configured to cool the third sub-chamber.

9. The refrigerator according to claim 1, wherein the at least one compressor includes a first compressor and a second compressor, the at least one condenser includes a first condenser and a second condenser, the two cooling flow path include a first ice making flow sub-path and a second ice making flow sub-path;

the first ice making flow sub-path includes a first throttling sub-device, and the first compressor, the first condenser, the first throttling sub-device, and the first refrigerant pipe are arranged in sequence along a flow direction of a refrigerant in the first ice making flow sub-path; and the second ice making flow sub-path includes a second throttling sub-device, and the second compressor, the second condenser, the second throttling sub-device, and the second refrigerant pipe are arranged in sequence along a flow direction of a refrigerant in the second ice making flow sub-path;

wherein the first ice making flow sub-path and the second ice making flow sub-path are configured to cool the ice maker, and the first throttling sub-device and the second throttling sub-device are connected with inlet ends of the two refrigerant pipes, respectively, and outlet ends of the two refrigerant pipes are connected with a refrigerant inlet end of the first compressor and a refrigerant inlet end of the second compressor, respectively.

10. The refrigerator according to claim 9, wherein the chamber further includes a first sub-chamber, the refrigeration cycle system further includes a freezing flow path configured to cool the first sub-chamber, an end of the freezing flow path is connected to a refrigerant outlet end of the first condenser, another end of the freezing flow path is connected to the refrigerant inlet end of the first compressor, and the freezing flow path includes:

a second throttling device, an end of the second throttling device being connected to the refrigerant outlet end of the first condenser; and a first evaporator, the second throttling device and the first evaporator being arranged in sequence along a flow direction of a refrigerant in the freezing flow path, the first evaporator having a refrigerant inlet end and a refrigerant outlet end, the refrigerant inlet end of the first evaporator being connected to another end of the second throttling device, and the refrigerant outlet end of the first evaporator being connected to the refrigerant inlet end of the first compressor; the first evaporator being disposed between the ice maker and the first compressor, the outlet end of the first refrigerant pipe in the first ice making flow sub-path being connected to the refrigerant inlet end of the first evaporator.

11. The refrigerator according to claim 10, further comprising an ice storage box, wherein the refrigeration cycle system further includes a switching valve group located between the first throttling sub-device and a second node, the controller is coupled to the switching valve group and configured to control the first throttling sub-device to be communicated with or disconnected from the first condenser; the second node is located between the first throttling sub-device and the first condenser;

the controller is further configured to:
control the first ice making flow sub-path and the second ice making flow sub-path to open and the freezing flow path to be closed in a case where an amount of required ice cubes is greater than a third threshold and less than or equal to a maximum ice storage amount of the ice storage box;
control the freezing flow path and the first ice making flow sub-path to open and the second ice making flow sub-path to be closed in a case where the amount of required ice cubes is less than or equal to the third threshold and the first sub-chamber has a cooling demand;
control the second ice making flow sub-path to open and the first ice making flow sub-path and the freezing flow path to be closed in a case where the amount of required ice cubes is less than or equal to the third threshold and the first sub-chamber has no cooling demand; and
control the switching valve group to close the first ice making flow sub-path and control the second compressor to be closed, and the freezing flow path to open or be closed according to a temperature in the first sub-chamber, in a case where no ice making demand exists.

12. The refrigerator according to claim 9, wherein the first condenser and the second condenser are configured as a same condenser, and refrigerant outlet ends of the first compressor and the second condenser each are connected with a refrigerant inlet end of the condenser.

13. The refrigerator according to claim 1, wherein the portion of the first refrigerant pipe located within the range of the ice tray and the portion of the second refrigerant pipe located within the range of the ice tray each are in a shape of a capital letter U, an orthogonal projection of the portion of the first refrigerant pipe located within the range of the ice tray on a reference plane is located outside an orthogonal projection of the portion of the second refrigerant pipe located within the range of the ice tray on the reference plane.

14. The refrigerator according to claim 1, wherein the ice maker further includes a fixing plate detachably connected to the ice tray, and the fixing plate abuts against the two refrigerant pipes, so that the portions of the two refrigerant pipes located within the range of the ice tray are in contact with the bottom portion of the ice tray.

15. The refrigerator according to claim 1, further comprising a water injecting device coupled to the controller, wherein the controller is configured to:
obtain an ice making start instruction;
control the water injecting device to inject water into the ice tray;
control the water injecting device to stop injecting water and save current water injecting time after the current water injecting time is equal to a first preset time;
control the ice maker to start making ice;
control the ice maker to stop making ice after water currently injected into the ice tray has frozen;
determine that the ice tray has been filled with water and the ice maker has completed ice making if a sum of saved water injecting time is equal to a total water injecting time; and
control the water injecting device to inject water again and control the ice maker to make ice if the sum of the saved water injecting time is less than the total water injecting time.

16. The refrigerator according to claim 15, further comprising an ice storage box configured to store ice cubes made by the ice maker, wherein the controller is further configured to:
control the ice maker to perform ice scraping if the ice storage box is not full of ice in a case where the sum of the saved water injecting time is equal to the total water injecting time.

17. The refrigerator according to claim 15, wherein the controller is configured to determine that the water currently injected into the ice tray has frozen in a case where an ice making duration of the ice maker reaches a second preset time.

18. The refrigerator according to claim 15, wherein after each water injection is completed and before the ice maker makes ice, the controller is further configured to control the ice maker to start making ice after the water injection is stopped and waiting time of the ice maker reaches a third preset time.

19. The refrigerator according to claim 15, wherein the controller is further configured to:
control the water injecting device to continue injecting water in a case of obtaining an ice making stop instruction during a water injection process;
control the water injecting device to stop injecting water and save the current water injecting time after the current water injecting time is equal to the first preset time;
control the ice maker not to make ice; and
control the ice maker to start making ice after obtaining the ice making start instruction.

20. The refrigerator according to claim 15, wherein the controller is further configured to:
control the ice maker to continue making ice in a case of obtaining an ice making stop instruction during an ice making process;
control the ice maker to stop making ice after water currently injected into the ice tray has frozen;
determine that the ice tray has been filled with water and the ice maker has completed ice making if obtaining the ice making start instruction, and the sum of the saved water injecting time is equal to the total water injecting time; and
control the water injecting device to inject water again and the ice maker to make ice if obtaining the ice making start instruction and the sum of the saved water injecting time is less than the total water injecting time.

* * * * *